(12) United States Patent
Da et al.

(10) Patent No.: US 11,777,676 B2
(45) Date of Patent: Oct. 3, 2023

(54) METHOD AND DEVICE FOR TRANSMITTING POSITIONING REFERENCE SIGNAL

(71) Applicant: DATANG MOBILE COMMUNICATIONS EQUIPMENT CO., LTD., Beijing (CN)

(72) Inventors: Ren Da, Beijing (CN); Fang-Chen Cheng, Beijing (CN); Hui Li, Beijing (CN); Xueyuan Gao, Beijing (CN); Bin Ren, Beijing (CN); Qiubin Gao, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 161 days.

(21) Appl. No.: 17/261,846

(22) PCT Filed: Jun. 21, 2019

(86) PCT No.: PCT/CN2019/092395
§ 371 (c)(1),
(2) Date: Jan. 20, 2021

(87) PCT Pub. No.: WO2020/015499
PCT Pub. Date: Jan. 23, 2020

(65) Prior Publication Data
US 2021/0297215 A1    Sep. 23, 2021

(30) Foreign Application Priority Data

Jul. 20, 2018  (CN) .......................... 201810804215.7
Feb. 15, 2019  (CN) .......................... 201910117859.3

(51) Int. Cl.
*H04L 5/00*  (2006.01)
*H04W 4/029*  (2018.01)
(Continued)

(52) U.S. Cl.
CPC .......... *H04L 5/0048* (2013.01); *H04W 4/029* (2018.02); *H04W 64/003* (2013.01); *H04W 72/0446* (2013.01)

(58) Field of Classification Search
CPC ....... H04L 5/00; H04L 5/0048; H04L 5/0007; H04L 27/2602; H04L 27/26;
(Continued)

(56) References Cited

U.S. PATENT DOCUMENTS 9,955,295 B1 *  4/2018  Zhou et al. ............. H04W 4/02
10,310,051 B2 *  6/2019  Kim et al. ............. G01S 5/0226
(Continued)

FOREIGN PATENT DOCUMENTS

BR  112019017970 A2 *  5/2020  ......... H04L 27/2613
CN  101662443 A  3/2010
(Continued)

OTHER PUBLICATIONS

Method and Device of a Terminal Positioning; ON 103338513 A; issued to Liu, Jin-nan (Year: 2013).*
(Continued)

*Primary Examiner* — Meless N Zewdu
(74) *Attorney, Agent, or Firm* — KILPATRICK TOWNSEND & STOCKTON, LLP

(57) ABSTRACT

Disclosed are a method and device for transmitting a positioning reference signal. The method includes a base station determining a time-frequency resource for sending a PRS according to configuration information of the PRS, mapping a PRS sequence to the time-frequency resource for sending the PRS, and sending the mapped PRS on the time-fre-
(Continued)

quency resource for sending the PRS, wherein the configuration information of the PRS comprises PRS frequency domain resource information; the PRS frequency domain resource information comprises PRS resource element (RE) frequency shift information, and the PRS RE frequency shift information is correlated with a PRS OFDM symbol index value calculated from a PRS occasion.

18 Claims, 16 Drawing Sheets

(51) Int. Cl.
  *H04W 64/00* (2009.01)
  *H04W 72/0446* (2023.01)
(58) Field of Classification Search
  CPC ......... H04L 2025/03796; H04L 27/261; H04L 27/262; H04L 27/00; H04L 27/042; H04L 2025/03783; H04L 27/26025; H04L 27/26134; H04L 5/0003; H04L 27/2613; H04L 27/2085; H04W 4/02; H04W 4/021; H04W 4/029; H04W 64/00; H04W 64/003; H04W 4/025; H04W 72/00; H04W 72/04; H04W 72/0446; H04W 12/08; H04W 12/086; H04W 12/088; H04W 12/104; G01S 5/10; G01S 5/0063; G01S 1/20; G01S 5/0236; H04B 17/27
  See application file for complete search history.

(56) References Cited

U.S. PATENT DOCUMENTS

| | | | |
|---|---|---|---|
| 2010/0260154 A1 | 10/2010 | Frank et al. | |
| 2015/0296359 A1* | 10/2015 | Edge | H04W 4/22 |
| 2015/0358986 A1* | 12/2015 | Yang et al. | H04W 72/12 |
| 2018/0054286 A1 | 2/2018 | Tang et al. | |
| 2018/0124787 A1 | 5/2018 | Wang et al. | |
| 2018/0217228 A1* | 8/2018 | Edge et al. | G01S 5/10 |
| 2019/0037529 A1* | 1/2019 | Edge et al. | H04W 64/004 |
| 2019/0327673 A1* | 10/2019 | Bitra et al. | H04W 52/0209 |
| 2020/0236644 A1* | 7/2020 | Gunnarsson et al. | H04W 64/00 |
| 2021/0076225 A1* | 3/2021 | Kim et al. | H04W 16/28 |

FOREIGN PATENT DOCUMENTS

| | | | | |
|---|---|---|---|---|
| CN | 102647790 | A | | 8/2012 |
| CN | 107079419 | A | | 8/2017 |
| CN | 107750437 | A | | 3/2018 |
| CN | 108024364 | A * | 5/2018 | ........... H04L 5/0048 |
| CN | 108282322 | A * | 7/2018 | ........... H04L 5/0048 |
| CN | 110365455 | A * | 10/2019 | ........ H04W 72/0446 |
| WO | 2013173406 | A1 | | 11/2013 |
| WO | WO 2016163943 | A1 * | 10/2016 | ........... G01S 5/0226 |
| WO | WO 2018137223 | A1 * | 8/2018 | ............ H04W 72/04 |
| WO | WO 2019045141 | A1 * | 3/2019 | ............ H04W 80/02 |

OTHER PUBLICATIONS

Method for Obtaining a Signal for Locating and/or System; ON 110192117 A; published to Edge et al. (Year: 2019).*
Systems and Methods to Facilitate Location Determination by Beamforming a Positioning Reference Signal; KR 20200032107 A; published to William et al. (Year: 2020).*
Method and Apparatus for Transmitting/Receiving Signals; KR 102218914 B1 (Year: 3021).*

* cited by examiner

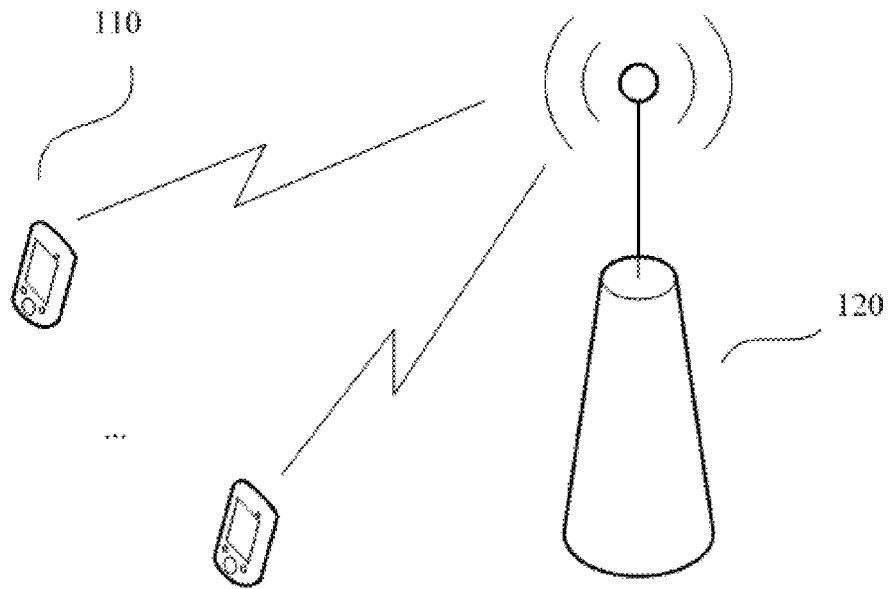

FIG. 4

A base station determines a time-frequency resource for sending a PRS according to configuration information of the PRS, where the configuration information of the PRS includes PRS frequency domain resource information, the PRS frequency domain resource information includes PRS RE frequency shift information, and the PRS RE frequency shift information is correlated with a PRS OFDM symbol sequence value calculated from a PRS occasion — S501

The base station maps a PRS sequence to the time-frequency resource for sending the PRS — S502

The base station sends the mapped PRS on the time-frequency resource for sending the PRS — S503

FIG. 5

S801 — The base station determines a muted and/or an unmuted PRS block on the time-frequency resource for sending the PRS according to PRS muting configuration information and the time-frequency resource for sending the PRS, where the PRS muting configuration information is used for indicating a muted PRS occasion group, a candidate muted PRS occasion group, and a muted PRS block in the candidate muted PRS occasion group S802 — The base station sends the mapped PRS on the PRS block determined to be unmuted and mutes the PRS on the PRS block determined to be muted

METHOD AND DEVICE FOR TRANSMITTING POSITIONING REFERENCE SIGNAL

CROSS REFERENCE TO RELATED APPLICATIONS

The present application is a US National Stage of International Application No. PCT/CN2019/092395, filed on Jun. 21, 2019, which claims priority to the Chinese Patent Application No. 201810804215.7, filed to the Patent Office of the People's Republic of China on Jul. 20, 2018 and entitled "METHOD AND DEVICE FOR TRANSMITTING POSITIONING REFERENCE SIGNAL", the entire contents of which are incorporated herein by reference; and the present application claims priority to the Chinese Patent Application No. 201910117859.3, filed to the Patent Office of the People's Republic of China on Feb. 15, 2019 and entitled "METHOD AND DEVICE FOR TRANSMITTING POSITIONING REFERENCE SIGNAL", the entire contents of which are incorporated herein by reference.

FIELD

The present application relates to the field of wireless communication and particularly relates to a method and device for transmitting a positioning reference signal (PRS).

BACKGROUND

Observed time difference of arrival (OTDOA) is a method for positioning by virtue of a measured downlink reference signal time difference introduced to a 3rd generation partnership project (3GPP). In the method, a terminal (UE also called user equipment) measures reference signals from a serving cell and a neighbor cell to obtain a reference signal time difference measurement (RSTD) and reports the RSTD to a network positioning server, and the network positioning server determines the position of the terminal according to the RSTD and a multipoint positioning algorithm or other algorithms.

In principle, the terminal may obtain the RSTD supporting the OTDOA by virtue of any downlink reference signal. In order to provide good OTDOA positioning performance, PRSs for supporting the OTDOA are defined by the 3GPP to help the terminal detect the downlink reference signals from a sufficient number of neighbor cells.

How to transmit the PRS is a problem to be solved at present.

SUMMARY

The Embodiments of the present application provide a method and device for transmitting a positioning reference signal.

On a first aspect, a method for transmitting a PRS is provided. The method includes: determining, by a base station, a time-frequency resource for sending the PRS according to configuration information of the PRS, mapping a PRS sequence to the time-frequency resource for sending the PRS, and sending the mapped PRS on the time-frequency resource for sending the PRS, where the configuration information of the PRS includes PRS frequency domain resource information; the PRS frequency domain resource information includes PRS resource element (RE) frequency shift information, and the PRS RE frequency shift information is correlated with a PRS orthogonal frequency division multiplexing (OFDM) symbol index value calculated from a PRS occasion.

In a possible implementation way, the PRS RE frequency shift information is a PRS RE frequency shift value which is obtained according to the following formula:

$$v_{shift} = (l' + N_{ID}^{PRS}) \bmod \left( \frac{N_{SC}^{RB}}{c_{PRS}} \right)$$

where $v_{shift}$ represents PRS RE frequency shift, $l'$ represents the PRS OFDM symbol index value calculated from the PRS occasion, $N_{ID}^{PRS}$ represents a PRS sequence identifier, $N_{SC}^{RB}$ represents the number of subcarriers in each PRS resource block (RB), $c_{PRS}$ represents a PRS RE density configuration parameter, and 'mod' represents modulo operation.

In a possible implementation way, the PRS RE frequency shift information includes a PRS OFDM symbol index value calculated from a PRS occasion. The method further includes:

determining, by the base station, PRS RE frequency shift by virtue of the PRS OFDM symbol index value calculated from the PRS occasion according to the following formula:

$$v_{shift} = (l' + N_{ID}^{PRS}) \bmod \left( \frac{N_{SC}^{RB}}{c_{PRS}} \right)$$

where $v_{shift}$ represents PRS RE frequency shift, $l'$ represents the PRS OFDM symbol index value calculated from the PRS occasion, $N_{ID}^{PRS}$ represents a PRS sequence identifier, $N_{SC}^{RB}$ represents the number of subcarriers in each PRS RB, $c_{PRS}$ represents a PRS RE density configuration parameter, and 'mod' represents modulo operation.

In a possible implementation way, the base station maps the PRS sequence to a frequency domain resource for sending the PRS according to the following formula:

$$a_{k,l}^{(p,\mu)} = \beta_{PRS} \gamma_{l,n_{s,f}}(n')$$

where $a_{k,l}^{(p,\mu)}$ represents a value of a resource element (k,l)p,μ, (k,l)p,μ represents a resource element of a frequency domain index k and a time domain index l of an antenna port p and subcarrier spacing configuration μ, $\beta_{PRS}$ represents a PRS sending power scaling factor, and $\gamma_{l,n_{s,f}}(n')$ represents a PRS sequence with an OFDM symbol index l in a slot $n_{s,f}$;

$$\text{where } k = \left(n + N_{PRS}^{start,\mu} + N_{grid,DL}^{start,\mu}\right) \times N_{SC}^{RB} + \frac{N_{SC}^{RB}}{c_{PRS}}k' + v_{shift}$$

$$n' = c_{PRS} \times \left(n + N_{PRS}^{start,\mu}\right) + k'$$

where a reference point of k represents a subcarrier 0 in a public resource block 0 in a public resource block grid, $N_{PRS}^{start,\mu}$ represents a starting point of a PRS bandwidth, $N_{grid,DL}^{start,\mu}$ represents a starting point of a downlink resource grid, $N_{SC}^{RB}$ represents the number of subcarriers in each PRS RB, $v_{shift}$ represents PRS RE frequency shift, $c_{PRS}$ represents a PRS RE density configuration parameter, n=0, 1, ..., $N_{RB}^{PRS}-1$, k'=0, 1, ..., $c_{PRS}-1$ and $N_{ID}^{PRS}$ represent a PRS bandwidth.

In a possible implementation way, before the base station sends the mapped PRS on the time-frequency resource for sending the PRS, the method further includes: determining, by the base station, a muted and/or an unmuted PRS block on the time-frequency resource for sending the PRS according to PRS muting configuration information and the time-frequency resource for sending the PRS; and the sending, by the base station, the mapped PRS on the time-frequency resource for sending the PRS, includes: sending, by the base station, the mapped PRS on a PRS block determined to be unmuted, where the PRS muting configuration information is used for indicating a muted PRS occasion group, a candidate muted PRS occasion group, and a muted PRS block in the candidate muted PRS occasion group.

In a possible implementation way, PRSs in one PRS block are transmitted by using the same beam.

In a possible implementation way, the PRS muting configuration information includes PRS occasion group muting configuration information for indicating a muted PRS occasion group and a candidate muted PRS occasion group, where all PRS blocks corresponding to the muted PRS occasion group are muted; and for each candidate muted PRS occasion group indicated by the PRS occasion group muting configuration information, corresponding PRS block muting configuration information is configured to indicate whether a PRS block in a corresponding candidate muted PRS occasion group is muted.

It may be seen from the above-mentioned first aspect that the PRS RE frequency shift information included in the configuration information of the PRS is correlated with the PRS OFDM symbol index value calculated from the PRS occasion, so that PRS symbols on the time-frequency resource for the PRS determined according to the configuration information of the PRS may be uniformly distributed in all subcarriers of a PRS frequency band as much as possible, and furthermore, the problem of larger auto-correlation side peak values caused by a traditional PRS mapping rule may be solved.

On a second aspect, a method for transmitting a PRS is provided. The method includes: determining, by a base station, a muted and/or an unmuted PRS block on a time-frequency resource for sending the PRS according to PRS muting configuration information and the time-frequency resource for sending the PRS, and sending a mapped PRS on a PRS block determined to be unmuted, where the PRS muting configuration information is used for indicating a muted PRS occasion group, a candidate muted PRS occasion group, and a muted PRS block in the candidate muted PRS occasion group.

In a possible implementation way, PRSs in one PRS block are transmitted by using the same beam.

In a possible implementation way, the PRS muting configuration information includes PRS occasion group muting configuration information for indicating a muted PRS occasion group and a candidate muted PRS occasion group, where all PRS blocks corresponding to the muted PRS occasion group are muted; and for each candidate muted PRS occasion group indicated by the PRS occasion group muting configuration information, corresponding PRS block muting configuration information is configured to indicate whether a PRS block in a corresponding candidate muted PRS occasion group is muted.

It may be seen from the above-mentioned second aspect that the base station determines the muted and/or the unmuted PRS block on the time-frequency resource for sending the PRS according to the PRS muting configuration information and the time-frequency resource for sending the PRS, and generally, PRSs in one PRS block are transmitted by using the same beam, so that a muting mode adopted during multi-beam transmission of the PRS may be supported.

On a third aspect, a base station is provided. The base station includes a determining device, configured to determine a time-frequency resource for sending a PRS according to configuration information of the PRS; a mapping device, configured to map, by the base station, a PRS sequence to the time-frequency resource for sending the PRS; and a sending device, configured to send, by the base station, the mapped PRS on the time-frequency resource for sending the PRS, where the configuration information of the PRS includes PRS frequency domain resource information, the PRS frequency domain resource information includes PRS resource element (RE) frequency shift information, and the PRS RE frequency shift information is correlated with a PRS OFDM symbol index value calculated from a PRS occasion.

In a possible implementation way, the PRS RE frequency shift information is a PRS RE frequency shift value which is obtained according to the following formula:

$$v_{shift} = (l' + N_{ID}^{PRS}) \bmod \left( \frac{N_{SC}^{RB}}{c_{PRS}} \right)$$

where $v_{shift}$ represents PRS RE frequency shift, l' represents the PRS OFDM symbol index value calculated from the PRS occasion, $N_{ID}^{PRS}$ represents a PRS sequence identifier, $N_{SC}^{RB}$ represents the number of subcarriers in each PRS resource block (RB), $c_{PRS}$ represents a PRS RE density configuration parameter, and 'mod' represents modulo operation.

In a possible implementation way, the PRS RE frequency shift information includes the PRS OFDM symbol index value calculated from the PRS occasion. The determining device is specifically configured to determine PRS RE frequency shift by virtue of the PRS OFDM symbol index value calculated from the PRS occasion according to the following formula:

$$v_{shift} = (l' + N_{ID}^{PRS}) \bmod \left( \frac{N_{SC}^{RB}}{c_{PRS}} \right)$$

where $v_{shift}$ represents PRS RE frequency shift, l' represents the PRS OFDM symbol index value calculated from the PRS occasion, $N_{ID}^{PRS}$ represents a PRS sequence identifier, $N_{SC}^{RB}$ represents the number of subcarriers in each PRS RB, $c_{PRS}$ represents a PRS RE density configuration parameter, and 'mod' represents modulo operation.

In a possible implementation way, the base station further includes a muting determining device. The muting determining device is configured to determine a muted and/or an unmuted PRS block on the time-frequency resource for sending the PRS according to PRS muting configuration information and the time-frequency resource for sending the PRS before the mapped PRS is sent on the time-frequency resource for sending the PRS. Where the PRS muting configuration information is used for indicating a muted PRS occasion group, a candidate muted PRS occasion group, and a muted PRS block in the candidate muted PRS occasion group. The sending device is specifically configured to send the mapped PRS on the PRS block determined to be unmuted.

In a possible implementation way, PRSs in one PRS block are transmitted by using the same beam.

On a fourth aspect, provided is a base station, including a muting determining device, configured to determine a muted and/or an unmuted PRS block on a time-frequency resource for sending a PRS according to PRS muting configuration information and the time-frequency resource for sending the PRS; and a sending device, configured to send a mapped PRS on the PRS block determined to be unmuted, where the PRS muting configuration information is used for indicating a muted PRS occasion group, a candidate muted PRS occasion group, and a muted PRS block in the candidate muted PRS occasion group.

In a possible implementation way, PRSs in one PRS block are transmitted by using the same beam.

In a possible implementation way, the PRS muting configuration information includes PRS occasion group muting configuration information for indicating a muted PRS occasion group and a candidate muted PRS occasion group, where all PRS blocks corresponding to the muted PRS occasion group are muted; and for each candidate muted PRS occasion group indicated by the PRS occasion group muting configuration information, corresponding PRS block muting configuration information is configured to indicate whether a PRS block in a corresponding candidate muted PRS occasion group is muted.

On a fifth aspect, provided is a communication device, including a processor, a memory and a transceiver, where the transceiver is configured to receive or transmit information under control of the processor; and the processor is configured to read a program in the memory and execute the method according to any one of the methods in the above-mentioned first aspect.

On a sixth aspect, provided is a communication device, including a processor, a memory and a transceiver, where the transceiver is configured to receive or transmit information under control of the processor; and the processor is configured to read a program in the memory and execute the method according to any one of the methods in the above-mentioned second aspect.

On a seventh aspect, provided is a computer readable storage medium, where the computer readable storage medium stores a computer executable instruction, and the computer executable instruction is configured to make a computer execute the method according to any one of the methods in the above-mentioned first aspect.

On an eighth aspect, provided is a computer readable storage medium, where the computer readable storage medium stores a computer executable instruction, and the computer executable instruction is configured to make a computer execute the method according to any one of the methods in the above-mentioned second aspect.

BRIEF DESCRIPTION OF THE DRAWINGS

FIG. 4 is a schematic diagram showing an architecture of a communication system applicable to embodiments of the present application.

FIG. 5 is a schematic diagram showing a PRS transmission flow according to an embodiment of the present application.

FIG. 9 is a schematic diagram showing a PRS transmission flow according to another embodiment of the present application.

FIG. 1C is a schematic diagram showing the configuration of muting of a PRS in a cell in a minimum unit of a PRS resource set in embodiments of the present application.

DETAILED DESCRIPTION OF THE EMBODIMENTS

Figure 1A:
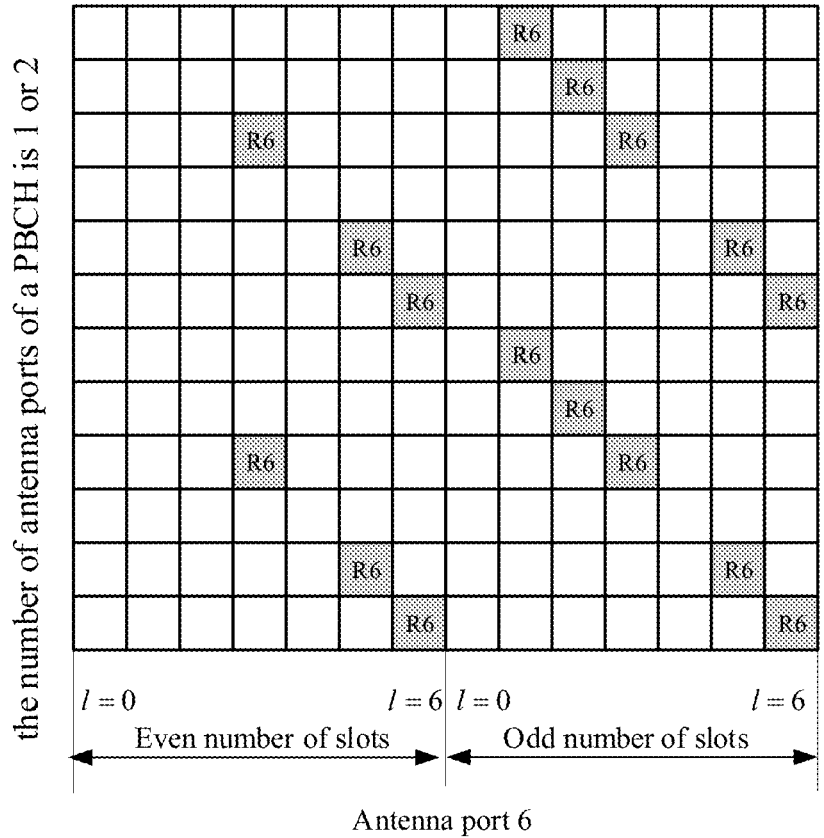
FIG. 1a and FIG. 1b are respectively schematic diagrams showing PRS resource mapping in an existing long term evolution (LTE) system.

Apart of terms in embodiments of the present application are described below.

(1) In the embodiments of the present application, nouns "network" and "system" are often used alternately.

(2) The term "multiple" in the embodiments of the present application refers to two or more, and other quantifiers are similar to it.

(3) "And/or" describes a correlation relationship among correlated objects and means that there are three relationships, for example, A and/or B may mean that A exists alone, A and B coexist, and B exists alone. The character "/" generally means that correlation objects before and after "/" are in an "or" relationship.

(4) In the embodiments of the present application, for facilitating description, following terms are defined:

PRS subframe: a subframe for sending a PRS in a radio frame, that is, the PRS is sent in the subframe;

PRS slot: a slot for sending a PRS in the PRS subframe, that is, the PRS is sent in the slot;

PRS RB: a resource block (RB) used for sending a PRS, that is, the PRS is sent in the RB;

PRS RE: a resource element (RE) used for sending a PRS, that is, the PRS is sent in the RE; and PRS occasion which may be understood as a time window, for sending a PRS in the time window or shutting off a PRS in the time window.

(5) In the embodiments of the present application, for facilitating description, following parameters are defined:

(k,l)p,µ represents a RE of a frequency domain index k and a time domain index l of an antenna port p and subcarrier spacing configuration µ;

$\alpha_{k,l}^{(p,\mu)}$ represents a value of the RE (k,l)p,µ, that is, data obtained after mapping on the RE (k,l)p,µ;

$\beta_{PRS}$ represents a PRS sending power scaling factor, which is configurable;

$c_{PRS}$ represents a PRS RB density configuration parameter, which represents the number of PRS REs on one PRS symbol in one PRS RB;

$\Delta f_{PRS}$ represents a subcarrier spacing of the PRS;

k represents a subcarrier index relative to a reference point; and In one embodiment, a reference point A of the parameter k is a subcarrier 0 in a public resource block 0 in a public resource block grid defined for 3GPP Ts 38.211;

l represents an orthogonal frequency division multiplexing symbol index in a slot;

µ represents subcarrier spacing configuration; and In one embodiment, µ∈ {0, 1, 2, 3, 4};

$N_{PRS}^{start,\mu}$ represents a starting point of a PRS bandwidth during the subcarrier spacing configuration µ, and the parameter is configurable;

$N_{RB}^{PRS}$ represents a PRS bandwidth, and the parameter is configurable;

$N_{SC}^{RB}$ represents the number of subcarriers in each resource block;

$N_{grid,DL}^{size,\mu}$ represents a size of a downlink resource grid during the subcarrier spacing configuration;

$N_{grid,DL}^{start,\mu}$ represents a starting point of the downlink resource grid during the subcarrier spacing configuration;

$N_{ID}^{PRS}$ represents a PRS sequence identifier;

$n_{s,f}^{\mu}$ represents a serial number of a slot in a frame during the subcarrier spacing configuration µ; and p represents the number of an antenna port of a PRS.

In the related art, a PRS in each cell is transmitted in a configured transmission mode. The transmission mode is defined according to a transmission time period, a transmission duration and a transmission offset. Within the transmission duration of the PRS, the PRS is transmitted on a PRS RE in a PRS OFDM symbol in a defined PRS subframe.

By using a PRS mapping rule provided in the related art, a PRS sequence $\gamma_{l,n_{s,f}}$ corresponding to an OFDM symbol index 1 in a subframe $n_{s,f}$ may be mapped on the PRS RE based on the following formula:

$$\alpha_{k,l}^{(p,\mu)} = \beta_{PRS} \gamma_{l,n_{s,f}}(n') \quad [1]$$

Where $\alpha_{k,l}^{(p,\mu)}$ represents a value of a PRS RE (k,l) during the antenna port p and the subcarrier spacing configuration µ, that is, the data obtained after the PRS sequence $\gamma_{l,n_{s,f}}$ is mapped on the RE may be expressed as $\alpha_{k,l}^{(p,\mu)}$. $\beta_{PRS}$ represents the PRS sending power scaling factor, and the parameter is configurable.

In the formula (1), an expression of n' is:

$$n' = c_{PRS} \times (n + N_{PRS}^{start,\mu}) + k' \quad [2]$$

In the formula (1), an expression of k is:

$$k = (n + N_{PRS}^{start,\mu} + N_{grid,DL}^{start,\mu}) \times N_{SC}^{RB} + \frac{N_{SC}^{RB}}{c_{PRS}} k' + v_{shift} \quad [3]$$

In the formulae (2) and (3), the reference point A of the parameter k may be a subcarrier 0 in a public resource block 0 in a public resource block grid defined for a communication protocol Ts 38.211 of an LTE system. $v_{shift}$ represents PRS RE frequency shift. N and k' are integers, n∈ {0, 1, ..., $N_{RB}^{PRS}$−1}, that is, n is equal to one of (0, 1, ..., $N_{RB}^{PRS}$−1), k'∈ {0, 1, ..., $c_{PRS}$−1}, that is, k' is equal to one of (0, 1, ..., $c_{PRS}$−1).

In the formula (3), an expression of PRS RE frequency shift $v_{shift}$ is:

$$v_{shift} = (l + N_{ID}^{PRS}) \bmod \left(\frac{N_{SC}^{RB}}{c_{PRS}}\right) \quad [4]$$

where l represents an OFDM symbol index in a slot occupied by the PRS. An operator "mod" in the formula represents modulo operation.

Figure 1B:
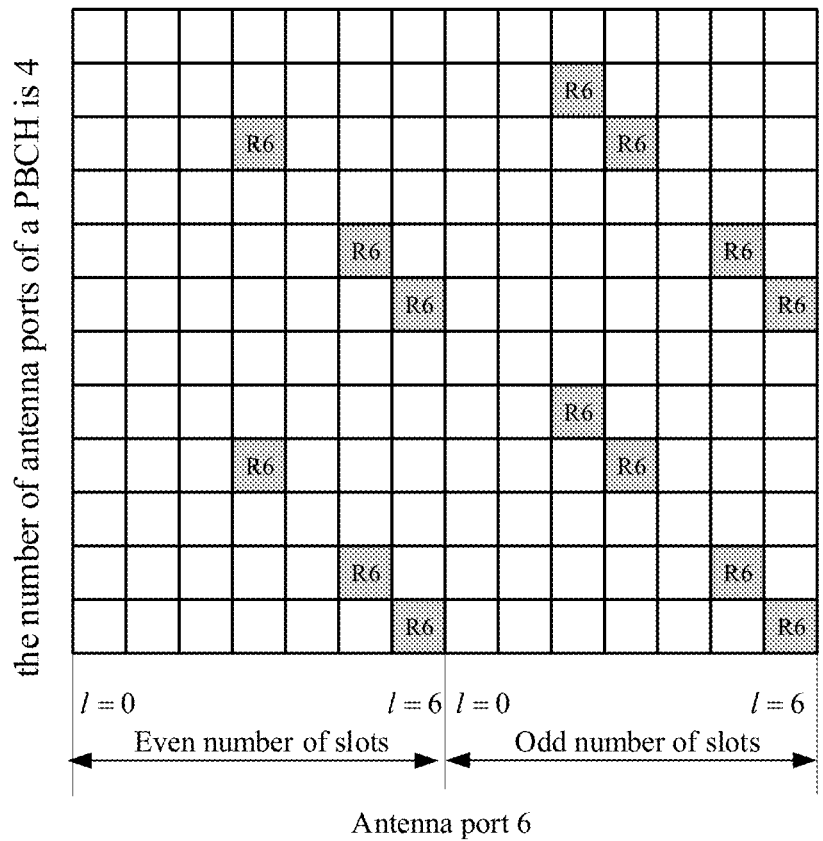

Based on the above-mentioned PRS mapping rule, in the LTE system, there will be two or more common subcarriers not mapped on a PRS sequence in all PRS RBs. As shown in FIG. 1a, when the number of antenna ports of an LTE physical broadcast channel (PBCH) is 1 or 2, no PRS is sent on a third subcarrier and a ninth subcarrier. As shown in FIG. 1b, when the number of the antenna ports of the LTE PBCH is 3 or 4, no PRS is sent on third, sixth, ninth and twelfth subcarriers. The PRS is sent by an RE labeled as "R6" in FIG. 1a and FIG. 1b.

Figure 2:
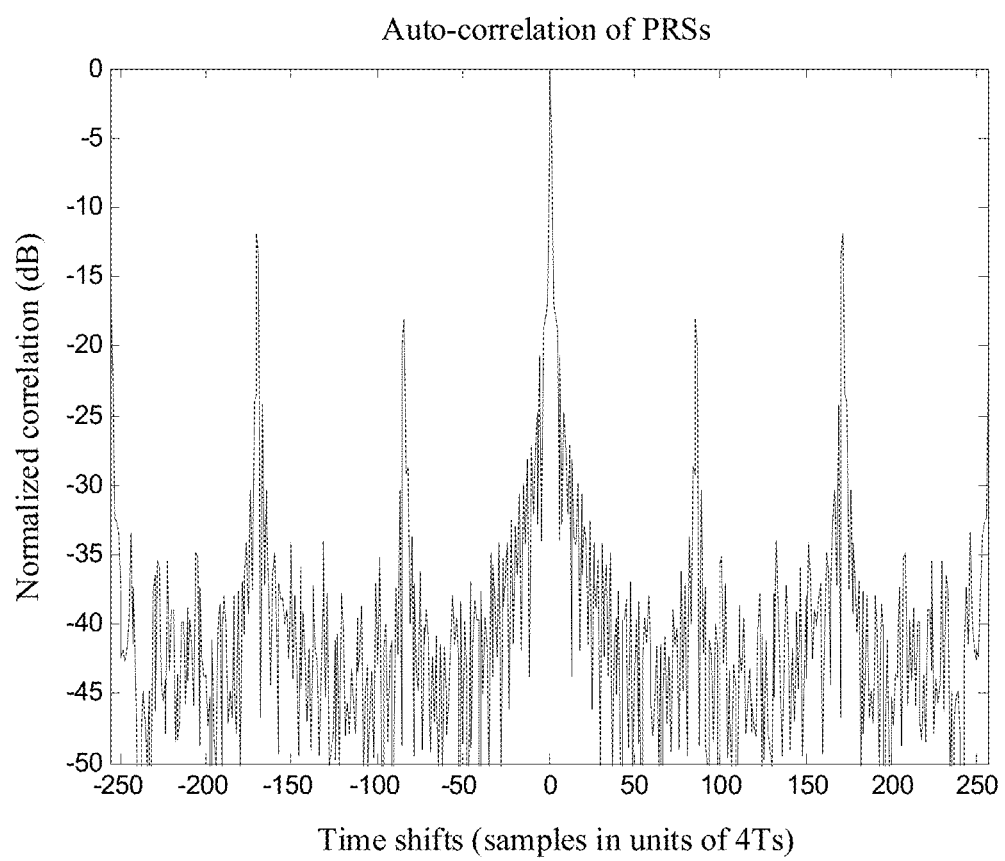
FIG. 2 is a schematic diagram showing PRS auto-correlation in the related art.

Due to the adoption of the above-mentioned PRS mapping rule provided in the related art, there are two or more common subcarriers on which no PRS is sent in all the PRS RBs, which will result in larger auto-correlation side peak values of the PRS, as shown in FIG. 2. These larger auto-correlation side peak values will bring adverse effects for the detection of auto-correlation main peak values of the PRS, for example, a side peak is mistakenly detected as a main peak.

Figure 3:
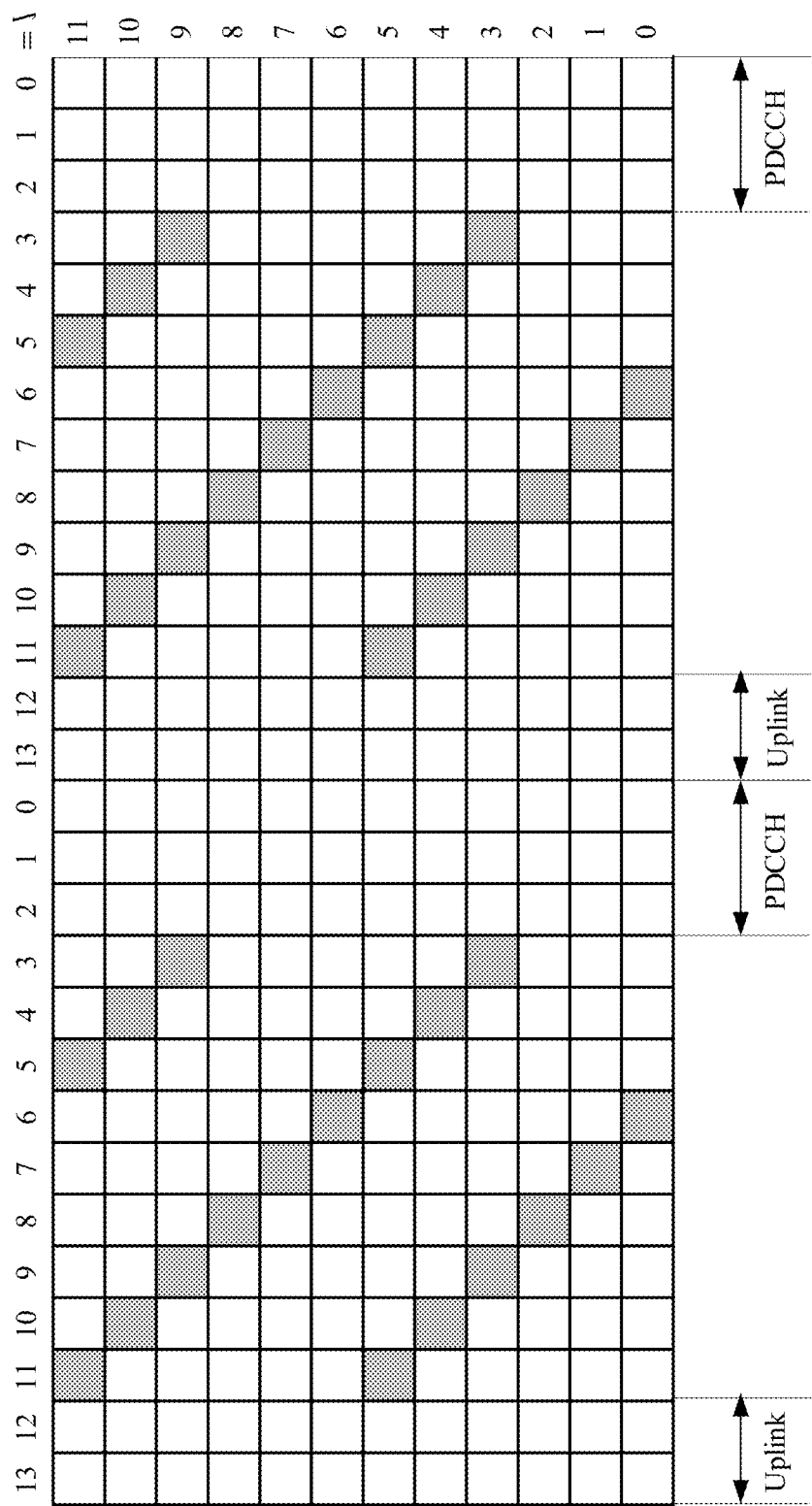
FIG. 3 is a schematic diagram showing PRS resource mapping in an existing new radio (NR) system.

It is also possible that the problem of non-uniformity distribution of PRS symbols of each subcarrier is generated in an existing NR PRS mapping rule. In an NR system, the distribution of PRS symbols in all PRS RBs is the same. As shown in FIG. 3, each square grid represents one RE, a horizontal direction represents a time domain, numerals labeled in the horizontal direction represent index values of OFDM symbols, a vertical direction represents a frequency domain, and numerals labeled in the vertical direction are used for identifying subcarriers. It is assumed that there are 2 PRS RBs in a PRS occasion, PRS symbols are only mapped into effective downlink OFDM symbols, that is, first 3 downlink OFDM symbols retained for a physical downlink control channel (PDCCH) and last 2 OFDM symbols retained for an uplink are skipped. It can be seen from FIG. 3 that PRS symbols (such as subcarrier 4) on some subcarriers may be doubled as comparison with PRS symbols (such as subcarrier 1) on other subcarriers in each PRS RB.

Embodiments of the present application provide a PRS mapping rule by which the PRS may be uniformly distributed on all the subcarriers as much as possible, and thus, the auto-correlation side peak values may be reduced.

In the embodiments of the present application, a PRS configuration method is provided for the PRS which may be applied to a 5G-NR. Specifically, the PRS configuration method may include the following aspects.

(1) A Subcarrier Spacing of the PRS

The 5G-NR supports downlink subcarrier spacings {15, 30, 60} kHz within a frequency range of 450 MHz-6000

MHz, i.e., a frequency range FR1 (Frequency Range 1); and the 5G-NR supports downlink channel subcarrier spacings {60, 120, 240} kHz within a frequency range of 24250 MHz-52600 MHz, i.e., a frequency range FR2 (Frequency Range 2), where the subcarrier spacing 240 kHz is only used for sending a synchronization signal (SS)/PBCH block. Therefore, the embodiments of the present application proposes that the subcarrier spacing of the PRS is used as a configurable parameter. A base station may send configuration information of the subcarrier spacing of the PRS, so that a terminal obtains the subcarrier spacing of the PRS.

In the embodiments of the present application, configurable subcarrier spacings of the PRS include {15, 30, 60} kHz within the frequency range of 450 MHz-6000 MHz, i.e., the frequency range FR1, that is, within the frequency range FR1, the configuration information, sent from the base station to the terminal, of the subcarrier spacing of the PRS is one of the subcarrier spacings {15, 30, 60} kHz. Within the frequency range of 24250 MHz-52600 MHz, i.e., the frequency range FR2, configurable subcarrier spacings of the PRS are {60, 120, 240} kHz, that is, within the frequency range FR1, the configuration information, sent from the base station to the terminal, of the subcarrier spacing of the PRS is one of the subcarrier spacings {60, 120, 240} kHz.

The subcarrier spacing of the PRS is used as the configurable parameter, so that a network may configure the subcarrier spacing of the PRS to be same with or different from subcarrier spacings of other signals for data communication as required. When the subcarrier spacing of the PRS is configured to be same with the subcarrier spacings of other signals for data communication, the complexity of implementation in a system may be reduced, for example, it is convenient to arrange time and frequency resources. When the subcarrier spacing of the PRS is configured to be different from the subcarrier spacings of other signals for data communication, it is convenient to optimize the utilization of the time and frequency resources.

(2) A Transmission Bandwidth of the PRS

In order to maximize the positioning performance, how to transmit the PRS by utilizing all resource blocks (RB) in a carrier bandwidth may be taken into account when a transmission bandwidth of a PRS is configured. For example, carrier bandwidths supported by LTE are {1.5, 3, 5, 10, 15, 20} MHz, and the maximum PRB number corresponding to each carrier bandwidth is {6, 15, 25, 50, 75, 100} RB. Therefore, the transmission bandwidths of the PRS supported by the PRS in the LTE system are {6, 15, 25, 50, 75, 100} RB.

Carrier bandwidths supported by the NR system have not been limited to {1.5, 3, 5, 10, 15, 20} MHz, and the maximum PRB number corresponding to the carrier bandwidth {1.5, 3, 5, 10, 15, 20} MHz is no longer {6, 15, 25, 50, 75, 100} RB and is correlated with the corresponding subcarrier spacing. Therefore, the configuration of the transmission bandwidth of the PRS may be different from the configuration of a transmission bandwidth of an LTE PRS. A configuration way of the transmission bandwidth of the PRS in the embodiment of the present application may be shown as following Table 1 and Table 2 according to the carrier bandwidth supported by the NR system correlated with 3GPP TS38.104 and the maximum RB number corresponding to the carrier bandwidth at the corresponding subcarrier spacing. Table 1 is configuration of the transmission bandwidth of the PRS within the FR1, and Table 2 is configuration of the transmission bandwidth of the PRS within the FR2.

TABLE 1

Configuration of Transmission Bandwidth of PRS within Frequency Range FR1

| Subcarrier spacing (kHz) | Configuration of transmission bandwidths (RBs) of downlink (DL) PRS |
|---|---|
| 15 | 25, 52, 79, 106, 133, 160, 216, 270 |
| 30 | 11, 24, 38, 51, 65, 78, 106, 133, 162, 189, 217, 245, 273 |
| 60 | 11, 18, 24, 31, 38, 51, 65, 79, 93, 107, 121, 135 |

TABLE 2

Configuration of Transmission Bandwidth of PRS within Frequency range FR2

| Subcarrier spacing (kHz) | Configuration of transmission bandwidths (RBs) of DL PRS |
|---|---|
| 60 | 66, 132, 264 |
| 120 | 32, 66, 132, 264 |

During specific implementation, the base station may send configuration information of the transmission bandwidth of the PRS to the terminal. The transmission bandwidth of the PRS is correlated with the subcarrier spacing of the PRS. the base station may obtain a group of transmission bandwidth parameters corresponding to the current subcarrier spacing of the PRS from the Table 1 and the Table 2 according to the current frequency range and the current subcarrier spacing of the PRS within the frequency range, and select one of the transmission bandwidth parameters, to obtain the configuration information of the transmission bandwidth of the PRS and sending the configuration information to the terminal.

(3) Configuration of a Duration, a Period and a Time Offset of the PRS

In the LTE system, each OTDOA positioning occasion includes $N_{PRS}=\{1, 2, 4, 6\}$ continuous PRS subframes. A sending period of the OTDOA positioning occasion may be configured to be P={5, 10, 20, 40, 80, 160, 320, 640, 1280} subframes, and a time offset may be configured to be {0, 1, . . . , P−1}.

In order to ensure that an NR OTDOA has the positioning performance similar to or better than that of an LTE OTDOA, in the embodiments of the present application, when the subcarrier spacing of the PRS is 15 kHz, the configuration of a duration, a period and a time offset of an NR DL PRS covers at least the configuration of a duration, a period and a time offset of an LTE PRS. For other subcarrier spacings of the PRS, the duration, the period and the time offset of the PRS may be automatically adjusted in unit of slots, that is, the duration, the period and the time offset of the PRS may be adjusted in unit of slots.

Specifically, in the embodiments of the present application, each NR OTDOA positioning occasion (also called PRS occasion) includes configurable $N_{PRS}=\{1, 2, 4, 6\}$ slots. A sending period of the NR OTDOA positioning occasion may be configured to be P={5, 10, 20, 40, 80, 160, 320, 640, 1280} slots. In addition, due to the consideration that the period of channel state information reference signals (CSI-RS) supported by an NR is P={4, 5, 8, 10, 16, 20, 32, 40, 64, 80, 160, 320, 640} slots and the consideration of resource sharing possibility of the CSI-RS and the PRS, the sending period of the PRS may be configured to be P={4, 8, 16, 32, 64} slots. Based on the above-mentioned consideration, in the embodiments of the present application, the sending period of the NR OTDOA positioning occasion is P={4, 5, 8, 10, 16, 20, 32, 40, 64, 80, 160, 320, 640, 1280} slots, and a corresponding offset may be configured to be {0, . . . , P−1} slots.

It should be noted that the sending period and configurable offset of the above-mentioned NR OTDOA positioning occasion may be generally refers to the sending period and time offset configuration of the PRS.

During specific implementation, the base station may send the configuration information of the transmission bandwidth of the PRS to the terminal, and the specific content of the configuration information may refer to the above-mentioned description.

The embodiments of the present application will be clearly and completely described below in combination with accompanying drawings in the embodiments of the present application.

Referring to FIG. 4 which is a schematic diagram showing a possible communication scenario according to embodiments of the present application, as shown in FIG. 4, a terminal 110 accesses to a wireless network by a radio access network (RAN) node 120 to obtain a service from an external network (such as Internet) by the wireless network or be in communication with other terminals by the wireless network.

The terminal is also called user equipment (UE), a mobile station (MS), a mobile terminal (MT) and the like and is a device providing voice and/or data connectivity for a user, such as a handheld device, and a vehicle-mounted device with a wireless connection function. At present, examples of some terminals include: a mobile phone, a tablet personal computer, a notebook computer, a palm computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home and the like.

A RAN is a part for accessing the terminal to the wireless network in the network. A RAN node (or device) is a node (or device) in a wireless access network and may also be called a base station. At present, examples of some RAN nodes include: a gNB, a transmission reception point (TRP), an evolved Node B (eNB), a radio network controller (RNC), a Node B (NB), a base station controller (BSC), a base transceiver station (BTS), a home base station (such as a home evolved NodeB, or a home Node B (HNB)), a base band unit (BBU), or a wireless fidelity (Wifi) access point (AP) and the like. In addition, in a network structure, the RAN may include a centralized unit (CU) node and a distributed unit (DU) node.

The above-mentioned communication architecture may be an access network architecture in a 5G system or an evolved system thereof.

The network architecture described in the embodiments of the present application aims at describing the embodiments of the present application more clearly, is not intended to construct a limitation on the embodiments of the present application. With the evolution of the network architecture, the embodiments of the present application are also applicable to similar problems.

The embodiments of the present application are described with a base station and a terminal as examples.

An OTDOA terminal may be positioned based on the above-mentioned communication system architecture. Specifically, a base station may map a PRS sequence on a time-frequency resource for sending a PRS and send a mapped PRS on the time-frequency resource for sending the PRS. A terminal may receive the PRS sent by the base station on the time-frequency resource for sending the PRS, obtain a RSTD according to measured PRSs from a serving cell and a neighbor cell, and report the RSTD to a network positioning server, so that the network positioning server may determine the position of the terminal according to the RSTD and a multipoint positioning algorithm or other algorithms.

Referring to FIG. 5 which is a schematic diagram showing a PRS transmission flow according to an embodiment of the present application, as shown in the figure, the flow may include the following steps.

S501, a base station determines a time-frequency resource for sending a PRS according to configuration information of the PRS.

The configuration information of the PRS may include PRS frequency domain resource information and may further include information such as a PRS RE density configuration parameter and PRS time domain resource information. Where the PRS frequency domain resource information is used for indicating a frequency domain resource of the PRS, and PRSs with different bandwidths may be configured on corresponding frequency positions according to the PRS frequency domain resource information. The PRS RE density configuration parameter is used for indicating the number of REs for sending the PRS in PRS RBs. The PRS time domain resource information is used for indicating the a time domain resource of the PRS and may specifically include configuration information of a slot in a PRS subframe (for indicating a slot for sending the PRS in a PRS subframe), configuration information of a symbol in a PRS slot (for indicating a symbol for sending the PRS in a PRS slot), a sending period and a time offset of the PRS subframe, etc.

The PRS frequency domain resource information may include PRS RE frequency shift information. Further, the PRS frequency domain resource information may further include parameters such as a starting point of a downlink resource grid, a starting point of a PRS bandwidth, the PRS bandwidth, a PRS sending power scaling factor. PRS RE frequency shift may be obtained according to the PRS RE frequency shift information, and the positions of the REs for sending the PRS in the PRS RBs may be determined according to the PRS RE frequency shift. When the frequency domain resource of the PRS is mapped, overlapping and interference between PRSs in adjacent cells may be reduced by the PRS RE frequency shift.

In the embodiments of the present application, the PRS RE frequency shift is correlated with a PRS OFDM symbol index value calculated from a PRS occasion Where the PRS OFDM symbol index value may be a serial number of a PRS OFDM symbol, all PRS OFDM symbols (that is, OFDM symbols for sending the PRS) in the PRS occasion may be continuously numbered in a time order, and the numbers are the serial numbers of the PRS OFDM symbols in the PRS occasion. For example, PRS OFDM symbols in a PRS occasion may be continuously numbered from 0. In one embodiment, the PRS RE frequency shift may depend on a serial number l' of a PRS OFDM symbol calculated from the PRS occasion, a PRS sequence identifier $N_{ID}^{PRS}$ and a PRS RE density configuration parameter $c_{PRS}$.

The PRS occasion includes $N_{PRS}$ ($N_{PRS} \geq 1$) continuous PRS subframes. In the embodiments of the present application, the sending period of the PRS in the PRS occasion and the offset of the PRS subframe may be configured. That is, the PRS occasion may be defined by parameters such as the sending period of the PRS and the offset of the PRS subframe in the configuration information of the PRS.

In a possible implementation way, the PRS RE frequency shift is specifically a PRS RE frequency shift value, and the base station may directly obtain the PRS RE frequency shift value according to the PRS RE frequency shift information.

In another possible implementation way, the PRS RE frequency shift information may further include multiple parameters for determining PRS RE frequency shift, and the base station may determine PRS RE frequency shift according to the parameters included in the PRS RE frequency shift information. For example, the PRS RE frequency shift information may include the PRS OFDM symbol index value l' calculated from the PRS occasion, the PRS sequence identifier $N_{ID}^{PRS}$ and the PRS RE density configuration parameter $c_{PRS}$.

Specifically, an expression of the PRS RE frequency shift may be:

$$v_{shift} = (l' + N_{ID}^{PRS}) \bmod \left( \frac{N_{SC}^{RB}}{c_{PRS}} \right) \quad [5]$$

where $v_{shift}$ represents the PRS RE frequency shift, l' represents the PRS OFDM symbol index value calculated from the PRS occasion, $N_{ID}^{PRS}$ represents a PRS sequence identifier, $N_{SC}^{RB}$ represents the number of subcarriers in each PRS resource block (RB), $c_{PRS}$ represents a PRS RE density configuration parameter, and 'mod' represents modulo operation.

S502, the base station maps a PRS sequence to the time-frequency resource for sending the PRS.

In a possible implementation way, the base station may map the PRS sequence to a frequency domain resource for sending the PRS according to the following formula:

$$\alpha_{k,l}^{(p,\mu)} = \beta_{PRS} \gamma_{l,n_{s,f}}(n'). \quad [6]$$

$$a_{k,l}^{(p,\mu)} = \beta_{PRS} r_{l,n_{s,f}}(n)$$

where $\alpha_{k,l}^{(p,\mu)}$ represents a value of a resource element (k,l)p, μ, (k,l)p,μ represents a resource element of a frequency domain index k and a time domain index l of an antenna port p and subcarrier spacing configuration μ, $\beta_{PRS}$ represents a PRS sending power scaling factor, and $\gamma_{l,n_{s,f}}(n')$ represents a PRS sequence with an OFDM symbol index l in a slot $n_{s,f}$.

In the formula (6), an expression of n' is:

$$n' = c_{PRS} \times (n + N_{PRS}^{start,\mu}) + k \quad [7]$$

In the formula (6), an expression of k is:

$$k = (n + N_{PRS}^{start,\mu} + N_{grid,DL}^{start,\mu}) \times N_{SC}^{RB} + \frac{N_{SC}^{RB}}{c_{PRS}} k' + v_{shift} \quad [8]$$

where a reference point of k represents a subcarrier 0 in a public resource block 0 in a public resource block grid, $N_{PRS}^{start,\mu}$ represents a starting point of a PRS bandwidth, $N_{grid,DL}^{start,\mu}$ represents a starting point of a downlink resource grid, $N_{SC}^{RB}$ represents the number of subcarriers in each PRS RB, $c_{PRS}$ represents a PRS RE density configuration parameter, n=0, 1, ..., $N_{RB}^{PRS}$–1, k'=0, 1, ..., $c_{PRS}$–1 and $N_{RB}^{PRS}$ represent a PRS bandwidth.

In the formula (6), $v_{shift}$ is the PRS RE frequency shift, and $v_{shift}$ may be obtained by calculation performed according to the above-mentioned formula (5).

S503, the base station sends the mapped PRS on the time-frequency resource for sending the PRS.

In one embodiment, the above-mentioned configuration information of the PRS may further include time domain configuration information which is used for indicating a starting position of the PRS in one slot, the PRS occupies N continuous symbols in one slot, and N is one of 1, 2, 3, 4, 6 and 12.

In the LTE system, each subframe is provided with a fixed OFDM symbol for sending a PDCCH and a cell-specific signal (CRS). Due to such a limitation, the number of OFDM symbols for sending a DL PRS in each LTE PRS subframe is limited to 8. In the NR system, the CRS is not been sent and that sending the PDCCH does not adopt fixed OFDM symbols. Therefore, the number of the OFDM symbols for sending the DL PRS in each PRS slot will not be limited to 8.

A NR DL PRS is required to support a multi-beam DL PRS sending mode. Therefore, 3GPP decides to introduce an NR DL PRS resource. On the aspect of time domain, one NR DL PRS resource may include one or more continuous OFDM symbols in one slot; and on the aspect of frequency domain, one NR DL PRS resource may include multiple continuous RBs. The base station sends a DL PRS in a certain beam direction by virtue of one or more NR DL PRS resources.

PRS REs need to be uniformly distributed in subcarriers in the configured PRS OFDM symbols as much as possible when the base station performs PRS resource configuration, so that the problem of error detection caused by larger auto-correlation side peak values possibly generated due to non-uniformity distribution of the PRS symbols of the subcarriers is avoided. In the embodiments of the present application, in order to support the multi-beam sending of the DL PRS, N={1, 2, 3, 4, 6, 12} continuous PRS OFDM symbols may be configured in one slot, and the N continuous PRS OFDM symbols are also configurable relative to starting positioning from the slot, so that N continuous PRS symbols may be flexibly distributed in the slot. For example, the number of the PRS OFDM symbols configured in a certain NR DL PRS slot is N=4. Due to the PRS RE density configuration that each PRB is provided with three PRS REs, each subcarrier in each PRB is uniformly distributed with one PRS RE.

Seen from the above-mentioned description, the PRS RE frequency shift information included in the configuration information of the PRS is correlated with the PRS OFDM symbol index value calculated from the PRS occasion, so that PRS symbols on the time-frequency resource for the PRS determined according to the configuration information of the PRS may be uniformly distributed in all subcarriers of a PRS frequency band as much as possible, and furthermore, the problem of larger auto-correlation side peak values caused by a traditional PRS mapping rule may be solved.

Figure 6:
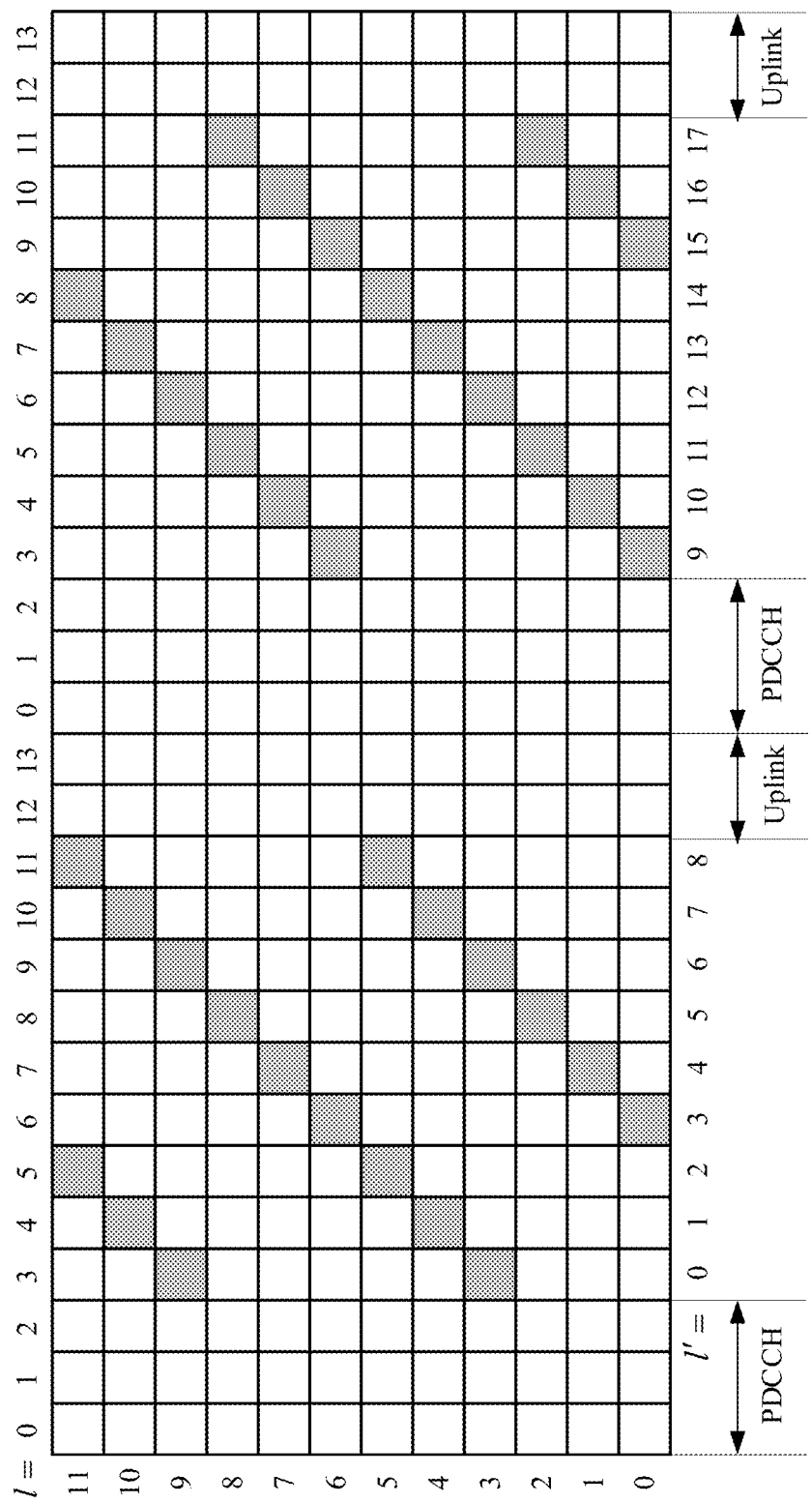
FIG. 6 is a schematic diagram showing PRS resource mapping in embodiments of the present application.

Based on the method according to the above-mentioned embodiments of the present application, FIG. 6 exemplarily shows a schematic diagram showing PRS resource mapping, where each square grid represents one RE, a horizontal direction represents a time domain, and a vertical direction represents a frequency domain. A numeral 1 labeled in the horizontal direction on the top of the figure represents an index value of an OFDM symbol, and a numeral l' labeled in the horizontal direction on the bottom of the figure represents a PRS OFDM symbol index value calculated from the PRS occasion (or called a serial number of a PRS OFDM symbol). The distribution of PRS symbols in 2 RBs is only shown in the figure. Seen from FIG. 6, in one PRS RB or PRS slot, the PRS symbols are uniformly distributed on all the subcarriers as much as possible (the number difference of the PRS symbols on all the subcarriers may not exceed one PRS symbol). In this way, the problem of larger auto-correlation side peak values caused by unreasonable distribution of the PRS symbols on all the subcarriers in the related art is solved.

Figure 7:
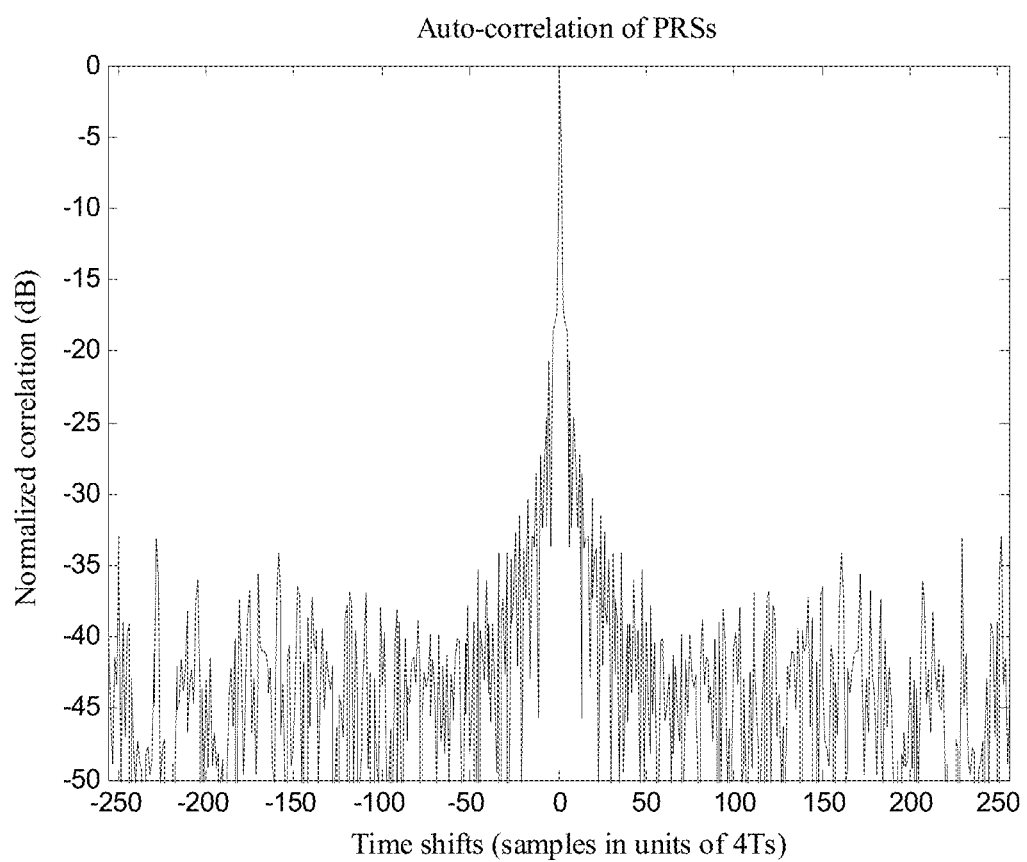
FIG. 7 is a schematic diagram showing an auto-correlation of a PRS in embodiments of the present application.

FIG. 7 exemplarily shows a schematic diagram showing auto-correlation of a resource-mapped PRS. By comparing FIG. 7 and FIG. 2, it can be seen that the problem of larger auto-correlation side peak values caused by a PRS resource mapping method in the related art may be solved by using a PRS resource mapping method according to embodiments of the present application.

When PRSs are simultaneously sent in multiple neighbor cells, the PRSs from the multiple cells may conflict in terms of time and frequency to generate inter-cell PRS-correlated collision and interference. Strong PRSs from near cells may cover weak PRSs from far cells, so that it will be difficult for the terminal to detect the PRSs from the far cells, this in turn leads to the loss of audibility, and the problem is particularly acute in dense cities or poor network deployment.

In order to solve the problem, embodiments of the present application further provide a PRS muting method to improve the detectability of PRSs in the far cells. The method may be applied to a 5G NR system and may be used for muting PRSs in a multi-beam PRS transmission scenario.

In order to support the multi-beam sending of an NR DL PRS, PRS resource sets (which may also be called resource blocks) are defined in the embodiments of the present application. One PRS resource set may be configured with one or more PRS resources, to support multi-beam sending of the PRS in different deployment scenarios. Each beam direction may correspond to one or more PRS resources. The number of the PRS resources in one PRS resource set may be configured to be same with or greater than the number of SS/PBCH blocks in a SS/PBCH block set. A corresponding relation between quasi co-locations (QCLs) of beams (such as directions, widths and the like) of the PRS resources and SS/PBCH beams (such as directions, widths and the like) may be indicated in the configuration. In this way, the terminal may rapidly detect the PRS under the help of a detected SS/PBCH, and thus, the power consumption of the terminal is reduced.

In addition, due to the consideration that the maximum number of CSI-RS resources supported by the NR system is 192 and each of the CSI-RS resources may correspond to one beam direction, the maximum number of PRS resources configurable in one PRS resource set may also be 192. In this way, the sharing of the PRS and CSI-RS resources may be favorably realized.

Figure 8:
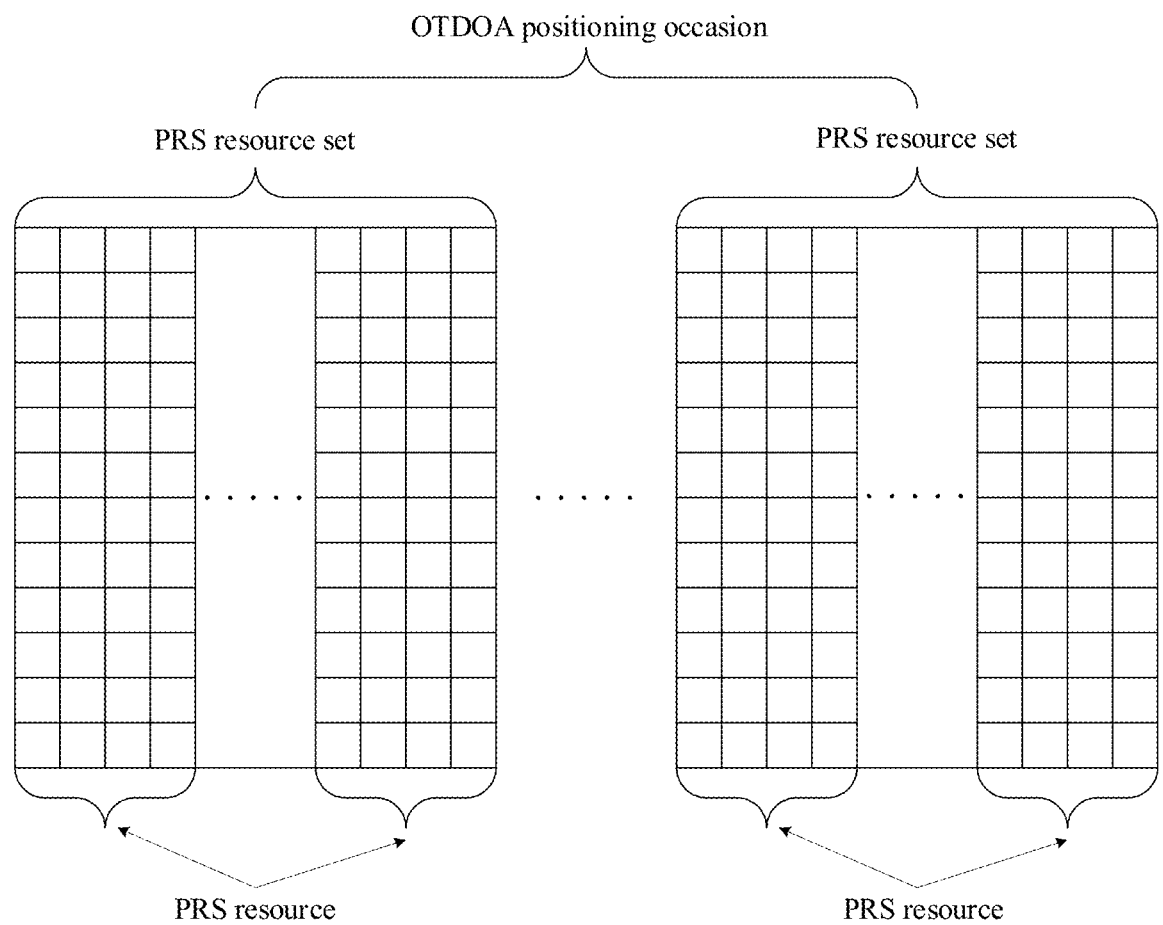
FIG. 8 is a schematic diagram showing a PRS resource, a PRS resource set and an OTDOA positioning occasion in embodiments of the present application.

For an NR OTDOA, in the embodiments of the present application, a group of continuously sent PRS resource sets may be configured to form one NR OTDOA positioning occasion, as shown in FIG. 8. In many cases, the terminal may not obtain a reliable positioning measurement value by detecting the PRS sent on a certain PRS resource (in a certain beam direction) once. The advantage that a group of continuously sent PRS resource sets is configured to form one NR DL OTDOA positioning occasion is that an opportunity is provided for the terminal to detect the PRS sent on a certain PRS resource (in a certain beam direction) many times in one beam direction, so that the terminal may obtain a more reliable positioning measurement value without waiting for a next PRS transmission period. The power consumption of the terminal may also be favorably reduced, and time delay in the OTDOA is shortened. In order to avoid the waste of the time-frequency resource, the duration of the NR OTDOA positioning occasion or the number of the continuously and repeatedly sent PRS resource sets is required to be configured within a certain time range, for example, the duration of the NR OTDOA positioning occasion is configured to be within 5 slots, or the number of the continuously and repeatedly sent PRS resource sets is configured to be within 5.

In the embodiments of the present application, a PRS occasion group is further defined. One PRS occasion group includes one or more PRS occasions, one PRS occasion includes one or more PRS blocks (or PRS resource sets), and one PRS block (or PRS resource set) includes one or more PRS resources. The number of the PRS occasion groups may be $T_{RES}=2^i$ (i=1, 2, . . . , 10).

The PRS resources in one PRS block (or PRS resource set) may be transmitted by using the same beam. One PRS block (or PRS resource set) may be composed of one or more continuous PRS OFDM signals or one or more continuous PRS slots. One PRS occasion, that is, one set of PRS blocks (or PRS resource sets), includes one or more PRS blocks (or PRS resource sets). The PRS occasion may be regarded as a set of PRS blocks (or PRS resource sets) required for realizing one-time beam scanning. The number of the PRS blocks (or PRS resource sets) included in one PRS occasion is configurable. For example, the number of the PRS blocks (or PRS resource sets) included in the one PRS occasion may be same with or different from the number of SS/PBCH blocks in one SS/PBCH block set.

In the embodiments of the present application, the base station may be configured with PRS muting configuration information. The PRS muting configuration information may be used as a component of the configuration information of the PRS or may also be independent of the configuration information of the PRS, which is not limited in the embodiment of the present application.

In a possible implementation way, the PRS muting configuration information is used for indicating a muted PRS occasion group, a candidate muted PRS occasion group, and a muted PRS block (PRS resource set) in the candidate muted PRS occasion group. The base station may determine on which PRS REs the PRS is sent and on which PRS REs the PRS is muted (that is, the PRS is not sent) according to the PRS occasion group to which the PRS belongs and the PRS muting configuration information.

In one embodiment, the PRS muting configuration information may include PRS occasion group muting configuration information and PRS block (or PRS resource set) muting configuration information. The PRS occasion group muting configuration information is used for indicating a muted PRS occasion group and a candidate muted PRS occasion group. Where all PRS blocks (PRS resource sets) corresponding to the muted PRS occasion group are required to be muted, and PRS blocks corresponding to the candidate muted PRS occasion group are candidate muted PRS blocks, that is, it is possible for the PRS blocks (PRS resource sets) corresponding to the candidate muted PRS occasion group to send the PRS or to be muted. For each candidate muted PRS occasion group indicated by the PRS occasion group muting configuration information, corresponding PRS block (or PRS resource set) muting configuration information may be configured to indicate whether a PRS block (or PRS resource set) in the corresponding candidate muted PRS occasion group is muted.

In one embodiment, each candidate muted occasion group includes $2^i$ (i=1, 2, . . . , 7) candidate muted PRS occasions, and each candidate muted PRS occasion includes {1, 2, . . . , 64} candidate muted PRS blocks (or PRS resource sets).

Referring to FIG. 9 which is a schematic diagram showing a PRS transmission flow according to another embodiment of the present application, and based on the flow, the base station may not send the PRS on the indicated PRS block (or PRS resource set) configured to be muted according to the PRS muting configuration information.

As shown in FIG. 9, the flow may include the following steps.

S801, the base station determines a muted and/or an unmuted PRS block (or PRS resource set) on the time-frequency resource for sending the PRS according to PRS muting configuration information and the time-frequency resource for sending the PRS.

The PRS muting configuration information is used for indicating a muted PRS occasion group, a candidate muted PRS occasion group, and a muted PRS block (or PRS resource set) in the candidate muted PRS occasion group.

In one embodiment, the step may be performed after the base station maps the PRS sequence to the time-frequency resource for sending the PRS according to the configuration information of the PRS. A specific implementation way that the base station maps the PRS sequence to the time-frequency resource for sending the PRS according to the configuration information of the PRS may refer to the way described in the above-mentioned embodiments, where PRS RE frequency shift information in the configuration information of the PRS is correlated with a PRS OFDM symbol index value calculated from a PRS occasion. A specific implementation way that the base station maps the PRS sequence to the time-frequency resource for sending the PRS according to the configuration information of the PRS may also be other ways, such as a way defined according to the current correlated communication standard.

S802, the base station sends the mapped PRS on the PRS block (or PRS resource set) determined to be unmuted and mutes the PRS (that is, the PRS is not sent) on the PRS block (or PRS resource set) determined to be muted.

In one embodiment, the PRS occasion group muting configuration information may adopt a bitmap form called PRS occasion group muting bitmap. Each bit in the PRS occasion group muting bitmap corresponds to one PRS occasion group; if a value of a bit is 1, it means that the corresponding PRS occasion group is muted, that is, the PRS occasion group is a muted PRS occasion group; and if a value of a bit is 0, it means that the corresponding PRS occasion group is a candidate muted PRS occasion group, and vice versa.

In one embodiment, the PRS block muting configuration information may adopt a bitmap form called PRS block muting bitmap. Each bit in the PRS block muting bitmap corresponds to one PRS block (or PRS resource set); if a value of a bit is 0, it means that the corresponding PRS block is muted, that is, the PRS block is a muted PRS block (or PRS resource set); and if a value of a bit is 1, it means that the corresponding PRS block (or PRS resource set) is unmuted, that is, the PRS is required to be sent, and vice versa.

Figure 10:
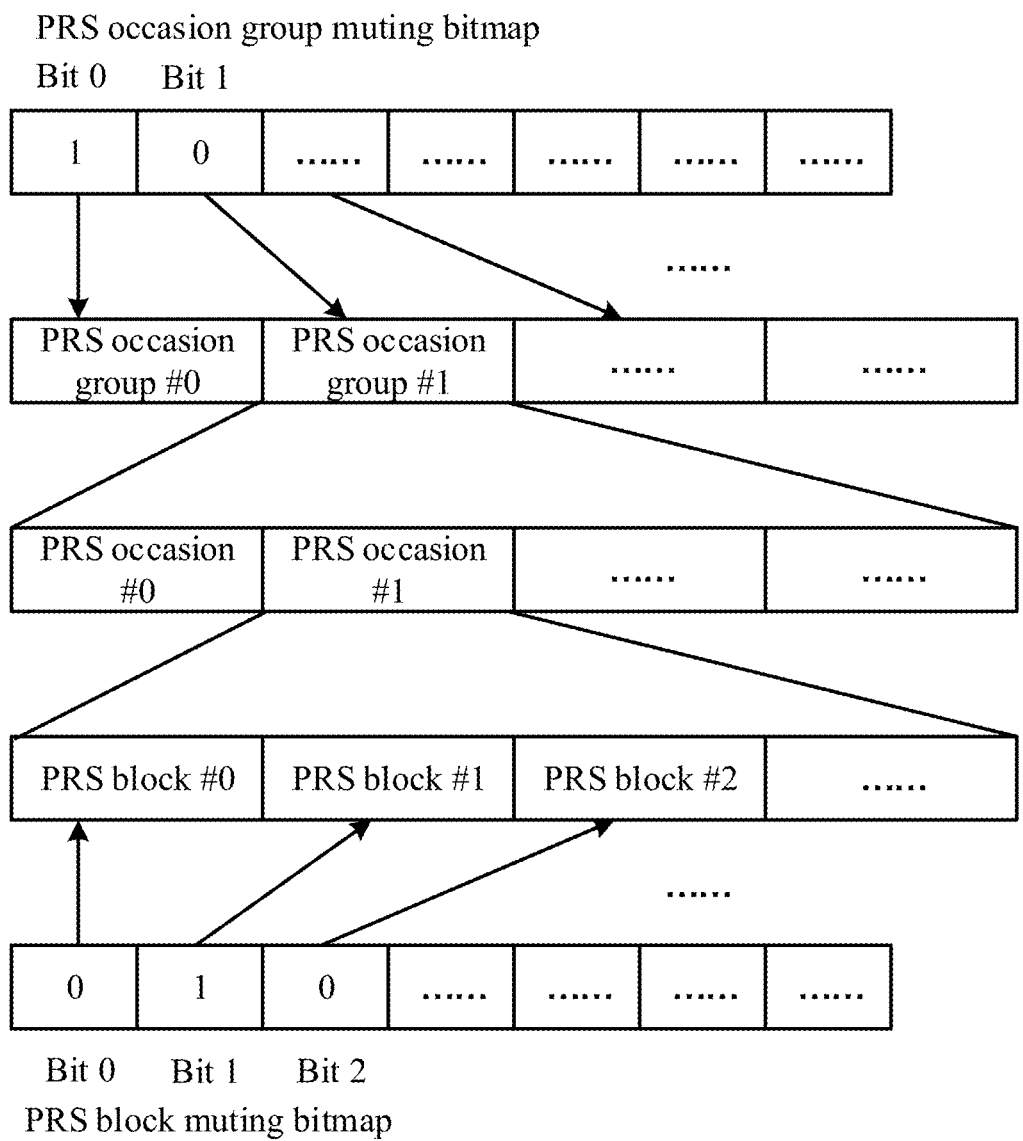
FIG. 10 is a schematic diagram showing PRS muting configuration according to embodiments of the present application.

With the PRS occasion group muting configuration information adopting the PRS occasion group muting bitmap and the PRS block (or PRS resource set) muting configuration information adopting the PRS block (or PRS resource set) muting bitmap as examples, FIG. 10 illustrates a schematic diagram showing PRS muting indication performed by adopting the PRS occasion group muting bitmap and the PRS block (or PRS resource set) muting bitmap. Where, one PRS occasion group includes one or more PRS occasions, one PRS occasion includes one or more PRS blocks (or PRS resource sets), each bit in the PRS occasion group muting bitmap corresponds to one PRS occasion group, and each bit in the PRS block muting bitmap corresponds to one PRS block (or PRS resource set).

As shown in FIG. 10, the value of bit 0 in the PRS occasion group muting bitmap is "1", it means that the corresponding PRS occasion group #0 is a muted PRS occasion group; and the value of bit 1 in the PRS occasion group muting bitmap is "0", it means that corresponding PRS occasion group #1 is a candidate muted PRS occasion group. In the PRS block muting bitmap corresponding to a PRS occasion #1 included in a candidate muted PRS occasion group #1, values of the bit 0 and bit 2 are "0", it means that the corresponding PRS block #0 and PRS block #2 are muted, and the value of the bit 1 is "1", it means that the corresponding PRS block #1 is unmuted.

According to the PRS muting configuration as shown in FIG. 10, the base station may mute all PRS blocks (or PRS resource sets) included in the PRS occasion group #0 (that is, PRSs are not sent), and mute the PRS blocks #0 and the PRS blocks #2 in the PRS occasions included in the PRS occasion group #1.

It can be seen from the above-mentioned PRS muting method that when the PRS block muting bitmap is an all-"0" sequence, the PRS occasion group muting bitmap determines which PRS occasion groups are muted. When the PRS occasion group muting bitmap is an all-"0" sequence, the PRS block (or PRS resource set) muting bitmap determines which PRS blocks (or PRS resource sets) are muted.

During practical implementation, the PRS occasion group muting bitmap and the PRS block (or PRS resource set) muting bitmap may be appropriately set according to the configuration information of the PRS in each cell and a multi-beam transmission direction of the PRS.

In the PRS muting method according to the embodiments of the present application, the base station determines a muted and/or an unmuted PRS block (or PRS resource set) on the time-frequency resource for sending the PRS according to the PRS muting configuration information and the time-frequency resource for sending the PRS, and PRSs in one PRS block (or PRS resource set) are transmitted by using the same beam, so that a muting mode adopted during multi-beam transmission of the PRS may be supported.

Another embodiment of the present application further provides following PRS muting configuration methods (referring to a first muting configuration method to a fourth muting configuration method). In the following muting configuration methods, provisions are made as follows.

A period of the muted PRS occasion group is $T_g$, that is, each period includes $T_g$ PRS occasion groups. $T_g$ may be configured to be different, for example, $T_g$={2, 4, 8, 16, 32, 64, 128, 256, 512, . . . }.

Each PRS occasion group includes $T_o$ PRS occasions. $T_o$ may be configured to be different, for example, $T_g$={1, 2, 4, 8, 16, . . . }.

Each PRS occasion includes $T_s$ PRS resource sets. $T_s$ may be configured to be different, for example, $T_o$={1, 2, 4, 8, 16, . . . }.

Each PRS resource set includes $T_r$ PRS resources. $T_r$ may be configured to be different, for example, $T_r$={1, 2, 4, 8, 16, . . . }.

The First Muting Configuration Method

Before the base station sends the PRS on the time-frequency resource for sending the PRS, a PRS resource which requires to be muted may be determined by executing the first muting configuration method.

In the method, the base station determines a muted and/or an unmuted PRS occasion group on the time-frequency resource for sending the PRS according to the PRS muting configuration information and the time-frequency resource for sending the PRS. Where the PRS muting configuration information includes PRS occasion group muting configuration information, and the PRS occasion group muting configuration information is used for indicating a PRS occasion group configured to be muted and/or unmuted in one or more PRS occasion groups. Accordingly, when the base station sends the mapped PRS on the time-frequency resource for sending the PRS, the mapped PRS may be sent in the PRS occasion group determined to be unmuted.

By using the method, a PRS in a cell may be configured to be muted in unit of the PRS occasion group.

Figure 11A:
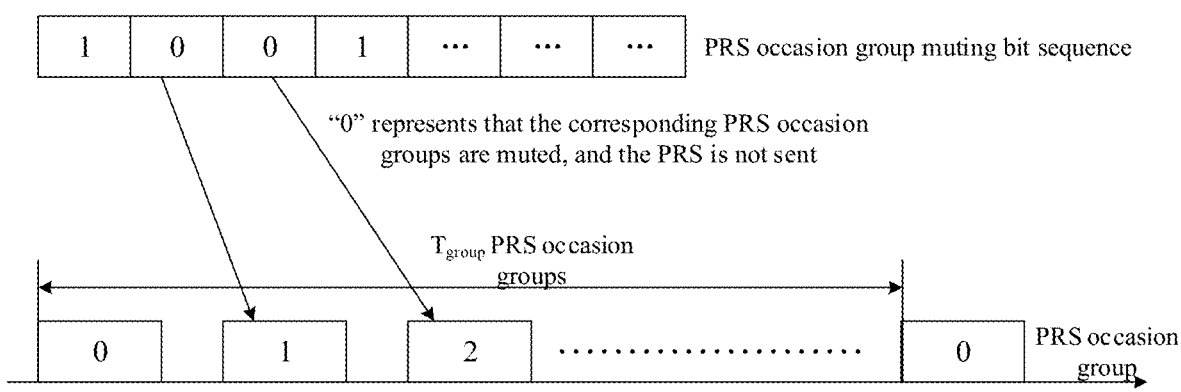
FIG. 11A is a schematic diagram showing the configuration of muting of a PRS in a cell in a unit of a PRS occasion group in embodiments of the present application.

For example, based on the above-mentioned provisions, as shown in FIG. 11A, the PRS occasion group muting configuration is defined by a PRS muting bit sequence $S_g$ with a length $T_g$, and $T_g$ is the number of PRS occasion groups in a muting configuration period. If a certain bit in the muting bit sequence $S_g$ is set to be "0", PRSs in the corresponding PRS occasion groups are muted, that is, the PRSs are not sent. If the bit in the muting bit sequence $S_g$ is set to be "1", the PRSs in the corresponding PRS occasion group are unmuted.

The Second Muting Configuration Method

Before the base station sends the PRS on the time-frequency resource for sending the PRS, a PRS resource which requires to be muted may be determined by executing the second muting configuration method.

In the method, the base station determines a muted and/or an unmuted PRS block or PRS resource set on the time-frequency resource for sending the PRS according to the PRS muting configuration information and the time-frequency resource for sending the PRS. Where the PRS muting configuration information includes a PRS occasion muting sequence corresponding to a candidate muted PRS occasion group, and the PRS occasion muting sequence is used for indicating a muted and/or an unmuted PRS occasion in the corresponding candidate muted PRS occasion group. Accordingly, when the base station sends the mapped PRS on the time-frequency resource for sending the PRS, the mapped PRS may be sent in the PRS occasion determined to be unmuted.

In one embodiment, the PRS muting configuration information further includes a PRS occasion group muting sequence, and the PRS occasion group muting sequence is used for indicating a muted PRS occasion group and a candidate muted PRS occasion group.

By using the method, a PRS in a cell may be configured to be muted in a minimum unit of the PRS occasion. The PRS occasion muting configuration may be realized jointly by 2 muting sequences (bit sequences).

Figure 11B:
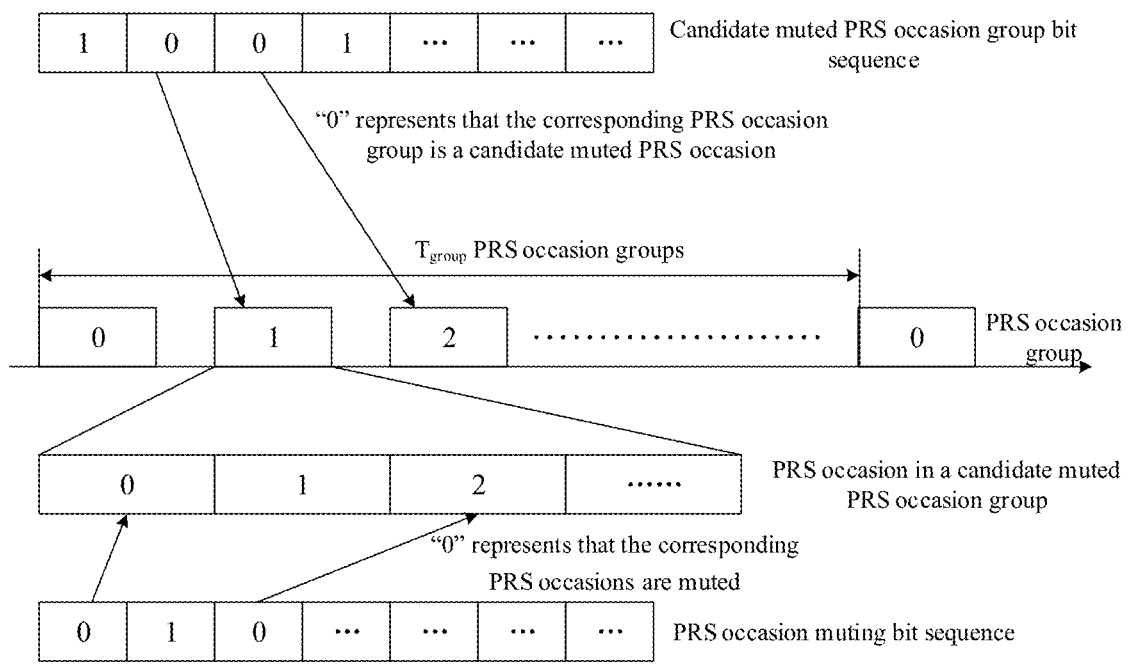
FIG. 11B is a schematic diagram showing the configuration of muting of a PRS in a cell in a minimum unit of a PRS occasion in embodiments of the present application.

For example, based on the above-mentioned provisions, as shown in FIG. 11B, the candidate muted PRS occasion group is defined by a PRS muting bit sequence $S_g$ with a length $T_g$, where the length $T_g$ is the number of PRS occasion groups in a muting configuration period. If a bit in the muting bit sequence $S_g$ is set to be "0", the corresponding PRS occasion group is a candidate muted PRS occasion group. In the candidate muted PRS occasion group, some PRS occasions will be muted, while some PRS occasions will be unmuted.

Which PRS occasions in the candidate muted PRS occasion group will be muted depends on another PRS occasion muting bit sequence $S_o$ with a length $T_o$, $T_o$ is the number of PRS occasions in one PRS occasion group. If a certain bit in the PRS occasion muting bit sequence $S_o$ is set to be "0", the corresponding PRS occasions in the candidate muted PRS occasion group are muted. If a certain bit in the PRS occasion muting bit sequence $S_o$ is set to be "1", the corresponding PRS occasions are unmuted.

In the method, the PRS muting bit sequence $S_g$ of the candidate muted PRS occasion group may not be configured. At the moment, all the PRS occasion groups may be the candidate muted PRS occasion groups.

The Third Muting Configuration Method

Before the base station sends the PRS on the time-frequency resource for sending the PRS, a PRS resource which requires to be muted may be determined by executing the third muting configuration method.

In the method, the base station determines a muted and/or an unmuted PRS block or PRS resource set on the time-frequency resource for sending the PRS according to the PRS muting configuration information and the time-frequency resource for sending the PRS. Where the PRS muting configuration information includes a PRS block or PRS resource set muting sequence corresponding to a candidate muted PRS occasion, and the PRS block or PRS resource set muting sequence is used for indicating a muted and/or an unmuted PRS block or PRS resource set in the corresponding candidate muted PRS occasion. Accordingly, when the base station sends the mapped PRS on the time-frequency resource for sending the PRS, the mapped PRS may be sent on the PRS block or PRS resource set determined to be unmuted.

In one embodiment, the PRS muting configuration information further includes a PRS block set or PRS occasion muting sequence corresponding to a candidate muted PRS occasion group, and the PRS block set or PRS occasion muting sequence is used for indicating a muted PRS occasion and a candidate muted PRS occasion in the corresponding candidate muted occasion group.

In one embodiment, the PRS muting configuration information further includes a PRS occasion group muting sequence, and the PRS occasion group muting sequence is used for indicating a muted PRS occasion group and a candidate muted PRS occasion group.

By using the method, a PRS in a cell may be configured to be muted in a minimum unit of the PRS resource set. The PRS occasion muting configuration may be realized jointly by 3 muting sequences (bit sequences).

Figure 11C:
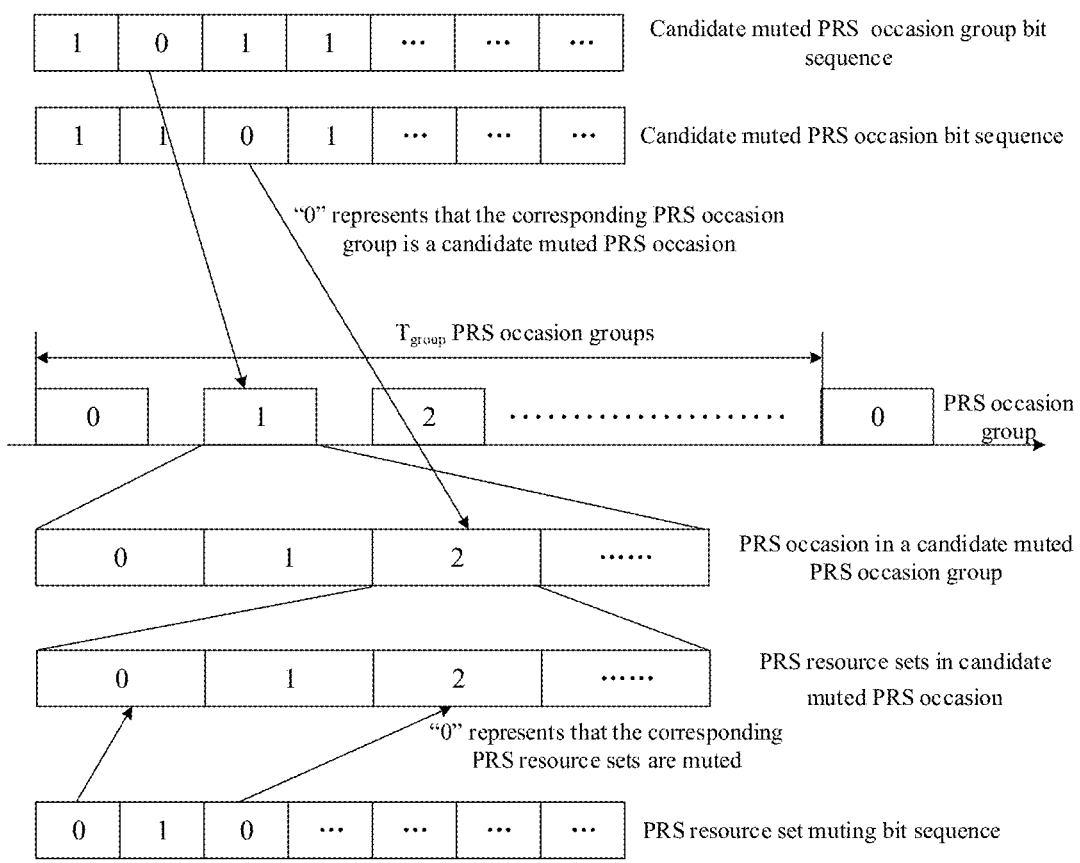
FIG. 11D is a schematic diagram showing the configuration of muting of a PRS in a cell in a minimum unit of a PRS resource in embodiments of the present application.

For example, based on the above-mentioned provisions, as shown in FIG. 11C, the candidate muted PRS occasion group is defined by the bit sequence $S_g$ with the length $T_g$, and $T_g$ is the number of PRS occasion groups in a muting configuration period. If a bit in the muting bit sequence $S_g$ is set to be "0", the corresponding PRS occasion group is the candidate muted PRS occasion group. In the candidate muted PRS occasion group, some PRS occasions will be muted, while some PRS occasions will be unmuted.

The candidate muted PRS occasion is defined by the bit sequence $S_o$ with the length $T_o$, and $T_o$ is the number of PRS occasions in a muted PRS occasion group. If a certain bit in $S_o$ is set to be "0", the corresponding PRS occasion in the candidate muted PRS occasion group is the candidate muted PRS occasion. If a certain bit in $S_o$ is set to be "1", the corresponding PRS occasion is unmuted.

Which PRS resource sets in the candidate muted PRS occasion will be muted depends on another PRS resource set muting bit sequence $S_s$ with a length $T_s$. $T_s$ is the number of PRS resource sets in one PRS occasion. If a certain bit in $S_s$ is set to be "0", the corresponding PRS resource set in the candidate muted PRS occasion is muted. If a certain bit in $S_s$ is set to be "1", the corresponding PRS resource set in the candidate muted PRS occasion is unmuted.

In the method, the bit sequence $S_g$ of the candidate muted PRS occasion group may not be configured, at the moment, all the PRS occasion groups may be regarded as the candidate muted PRS occasion groups. The bit sequence $S_o$ defining the candidate muted PRS occasion may not be configured, at the moment, the PRS occasions in all the candidate occasion groups are regarded as the candidate muted PRS occasions.

The Fourth Muting Configuration Method

Before the base station sends the PRS on the time-frequency resource for sending the PRS, a PRS resource which requires to be muted may be determined by executing the fourth muting configuration method.

In the method, the base station determines a muted and/or an unmuted PRS block or PRS resource set on the time-frequency resource for sending the PRS according to the PRS muting configuration information and the time-frequency resource for sending the PRS. Where the PRS muting configuration information includes a PRS resource muting sequence corresponding to a candidate muted PRS block or PRS resource set, and the PRS resource muting sequence is used for indicating a muted and/or an unmuted PRS resource in the corresponding candidate muted PRS block or PRS resource set. Accordingly, when the base station sends the mapped PRS on the time-frequency resource for sending the PRS, the mapped PRS may be sent on the PRS resource determined to be unmuted.

In one embodiment, the PRS muting configuration information further includes a PRS block or PRS resource set muting sequence corresponding to a candidate muted PRS occasion, and the PRS block or PRS resource set muting sequence is used for indicating a muted PRS block or PRS resource set and a candidate muted PRS block or PRS resource set in the corresponding candidate muted PRS occasion.

In one embodiment, the PRS muting configuration information further includes a PRS occasion muting sequence corresponding to a candidate muted PRS occasion group, and the PRS occasion muting sequence is used for indicating a muted PRS occasion and a candidate muted PRS occasion in the corresponding candidate muted occasion group.

In one embodiment, the PRS muting configuration information further includes a PRS occasion group muting sequence, and the PRS occasion group muting sequence is used for indicating a muted PRS occasion group and a candidate muted PRS occasion group.

By using the method, a PRS in a cell may be configured to be muted in a minimum unit of the PRS resource. The PRS occasion muting configuration may be realized jointly by 4 muting sequences (bit sequences).

Figure 11D:
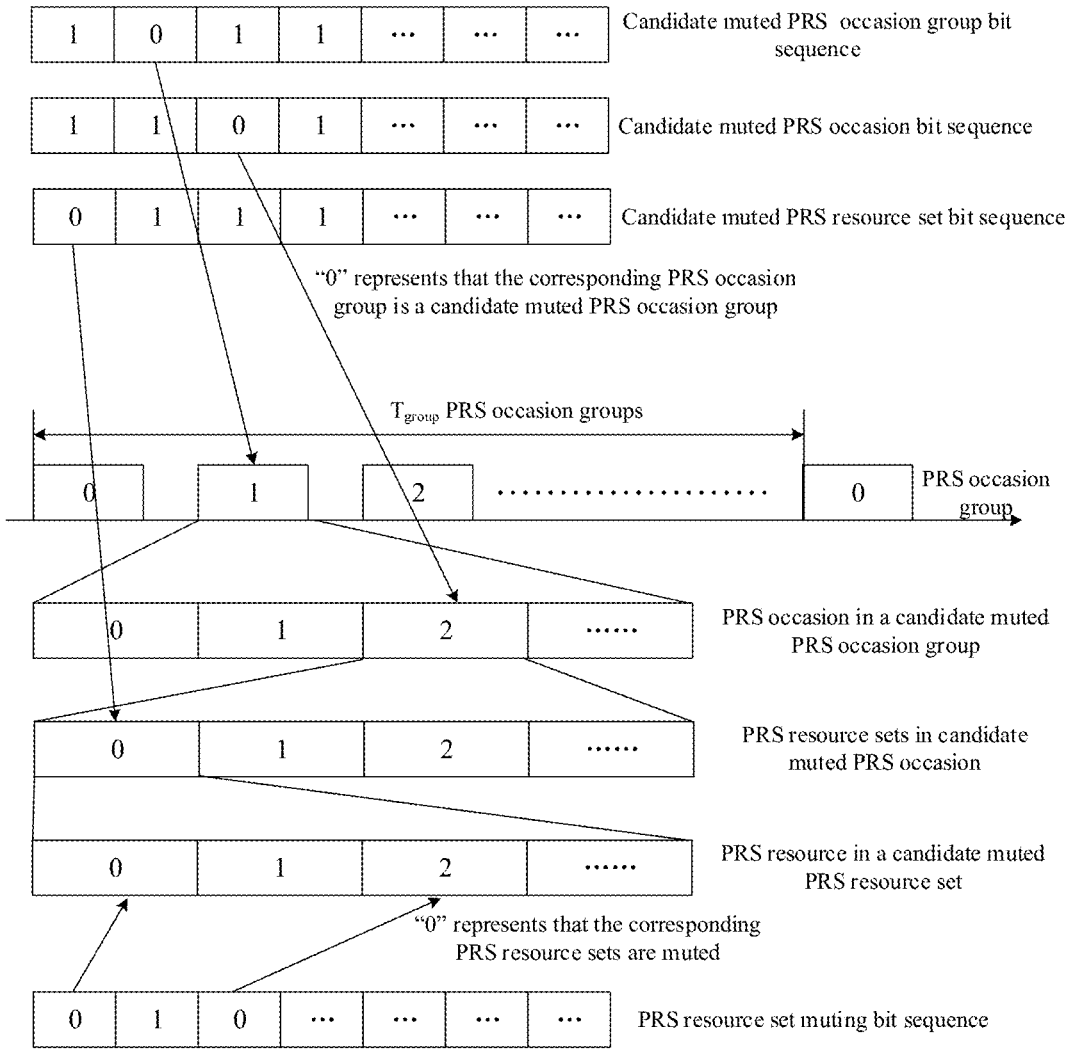

For example, based on the above-mentioned provisions, as shown in FIG. 11D, the candidate muted PRS occasion group is defined by a bit sequence $S_g$ with a length $T_g$, and $T_g$ is the number of PRS occasion groups in a muting configuration period. If a bit in the muting bit sequence $S_g$ is set to be "0", the corresponding PRS occasion group is the candidate muted PRS occasion group. In the candidate muted PRS occasion group, some PRS occasions will be muted, while some PRS occasions will be unmuted.

The candidate muted PRS occasion is defined by a bit sequence $S_o$ with a length $T_o$ and $T_o$ is the number of PRS occasions in a muted PRS occasion group. If a certain bit in $S_o$ is set to be "0", the corresponding PRS occasion in the candidate muted PRS occasion group is the candidate muted PRS occasion. If a certain bit in $S_g$ is set to be "1", the corresponding PRS occasion is unmuted.

A candidate PRS muting resource set is defined by a bit sequence $S_s$ with a length $T_s$, and $T_s$ is the number of PRS resource sets in a muted PRS occasion. If a certain bit in $S_s$ is set to be "0", the corresponding PRS resource set in the candidate muted muting occasion is the candidate PRS muting resource set. If a certain bit in $S_s$ is set to be "1", the corresponding PRS resource set is unmuted.

Which PRS resources in the candidate PRS muting resource set will be muted depends on another PRS resource muting bit sequence $S_r$ with a length $T_r$. $T_r$ is the number of PRS resources in one PRS resource set. If a certain bit in $S_r$ is set to be "0", the corresponding PRS resource in the candidate PRS muting resource set is muted. If a certain bit in $S_r$ is set to be "1", the corresponding PRS resource in the candidate PRS muting resource set is unmuted.

In the fourth method, the bit sequence $S_g$ of the candidate muted PRS occasion group may not be configured, at the moment, all the PRS occasion groups may be regarded as the candidate muted PRS occasion groups. The bit sequence $S_o$ defining the candidate muted PRS occasion may not be configured, at the moment, the PRS occasions in all the candidate occasion groups are regarded as the candidate muted PRS occasions. The bit sequence $S_o$ defining the candidate PRS muting resource set may not be configured, at the moment, the PRS resource sets in all the candidate occasions are regarded as the candidate muted PRS resource sets.

An embodiment of the present application further provides a base station by which functions of a base station side in FIG. 5 may be achieved.

Figure 12:
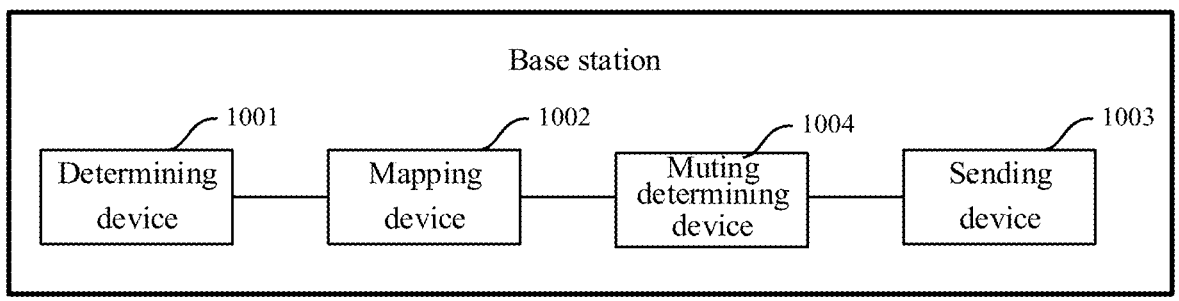
FIG. 12 is a schematic structural diagram showing a base station according to an embodiment of the present application.

Referring to FIG. 12 which is a schematic structural diagram showing a base station according to embodiments of the present application, the base station may include a determining device 1001, a mapping device 1002 and a sending device 1003. In one embodiment, the base station may further include a muting determining device 1004.

The determining device 1001 is configured to determine a time-frequency resource for sending a PRS according to configuration information of the PRS; the mapping device 1002 is configured to map, by the base station, a PRS sequence to the time-frequency resource for sending the PRS; the sending device 1003 is configured to send, by the base station, the mapped PRS on the time-frequency resource for sending the PRS. Where the configuration information of the PRS includes PRS frequency domain resource information, the PRS frequency domain resource information includes PRS RE frequency shift information, and the PRS RE frequency shift information is correlated with a PRS OFDM symbol index value calculated from a PRS occasion.

In one embodiment, the PRS RE frequency shift information is a PRS RE frequency shift value, which is obtained according to the above-mentioned formula (5).

In one embodiment, the PRS RE frequency shift information includes the PRS OFDM symbol index value calculated from the PRS occasion. The determining device 1001 is specifically configured to determine PRS RE frequency shift by virtue of the PRS OFDM symbol index value calculated from the PRS occasion according to the formula (5).

In one embodiment, the muting determining device 1004 is configured to determine a muted and/or an unmuted PRS block on the time-frequency resource for sending the PRS according to PRS muting configuration information and the time-frequency resource for sending the PRS, before the mapped PRS is sent on the time-frequency resource for sending the PRS. The sending device 1003 is specifically configured to send the mapped PRS on a PRS block determined to be unmuted. Where the PRS muting configuration information is used for indicating a muted PRS occasion group, a candidate muted PRS occasion group, and a muted PRS block in the candidate muted PRS occasion group.

In a possible implementation way, PRSs in one PRS block are transmitted by using the same beam.

Figure 13:
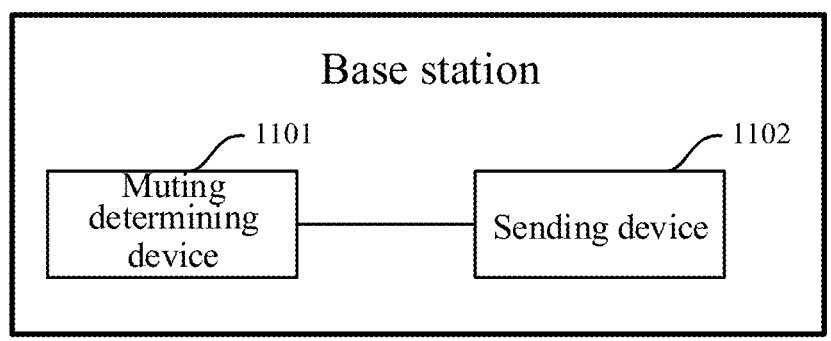
FIG. 13 is a schematic structural diagram showing a base station according to another embodiment of the present application.

Embodiments of the present application further provides a base station by which functions of a base station side in FIG. 13 may be achieved.

Referring to FIG. 13 which is a schematic structural diagram showing a base station according to embodiments of the present application, the base station may include a muting determining device 1101 and a sending device 1102.

The muting determining device 1101 is configured to determine a muted and/or an unmuted PRS block on a time-frequency resource for sending a PRS according to PRS muting configuration information and the time-frequency resource for sending the PRS; and the sending device 1102 is specifically configured to send a mapped PRS on a PRS block determined to be unmuted. Where the PRS muting configuration information is used for indicating a muted PRS occasion group, a candidate muted PRS occasion group, and a muted PRS block in the candidate muted PRS occasion group.

In a possible implementation way, PRSs in one PRS block are transmitted by using the same beam.

In a possible implementation way, the PRS muting configuration information includes PRS occasion group muting configuration information, and the PRS occasion group muting configuration information is used for indicating a muted PRS occasion group and a candidate muted PRS occasion group, where all PRS blocks corresponding to the muted PRS occasion group are muted; and for each candidate muted PRS occasion group indicated by the PRS occasion group muting configuration information, corresponding PRS block muting configuration information is configured to indicate whether a PRS block in a corresponding candidate muted PRS occasion group is muted.

Embodiments of the present application further provides a communication device by which the functions of the base station side in the flow shown in FIG. 5 in the above-mentioned embodiment may be achieved.

Figure 14:
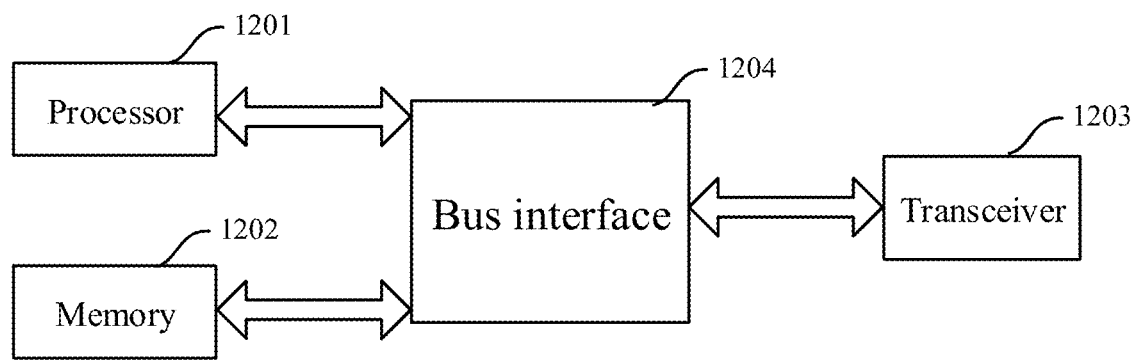
FIG. 14 is a schematic structural diagram showing a communication device according to an embodiment of the present application.

Referring to FIG. 14 which is a schematic structural diagram showing a communication device according to embodiments of the present application, as shown in the figure, the communication device may include a processor 1201, a memory 1202, a transceiver 1203 and a bus interface 1204.

The processor 1201 is responsible for managing a bus architecture and general processing. The memory 1202 may store data used when the processor 1201 executes operation. The transceiver 1203 is configured to receive and send data under the control of the processor 1201.

The bus architecture may include any number of interconnected buses and bridges, and specifically links various circuits of one or more processors represented by the processor 1201 and a memory represented by the memory 1202 together. The bus architecture may further link various other circuits such as a peripheral device, a voltage stabilizer and a power management circuit, which are publically known in the field, so that further description is not performed herein. The bus interface is provided with an interface. The processor 1201 is responsible for managing the bus architecture and general processing. The memory 1202 may store the data used when the processor 1201 executes operation.

The flow disclosed by the embodiments of the present application may be applied to the processor 1201 or implemented by the processor 1201. During implementation, each step of a signal processing flow may be completed by an integrated logic circuit in a hardware form in the processor 1201 or an instruction in a software form. The processor 1201 may be a general-purpose processor, a digital signal processor, an application-specific integrated circuit, a field-programmable gate array or other programmable logic devices, a discrete gate or transistor logic device and a discrete hardware component and is capable of implementing or executing each method, step and logic block diagram disclosed by the embodiments of the present application. The general-purpose processor may be a microprocessor or any conventional processor and the like. The flow may be directly embodied to be completed by a hardware processor or completed by combination of hardware and software devices in the processor in combination with the steps of the method disclosed in the embodiments of the present application. The software device may be located in a mature storage medium such as a random access memory, a flash memory, a read-only memory, a programmable read-only memory or an electrically erasable and programmable memory and a register in the field. The storage medium is located in the memory 1202, and the processor 1201 reads information in the memory 1202 and is combined with hardware therein to complete the steps of the signal processing flow.

Specifically, the processor 1201 is configured to read a program in the memory 1202 and execute a PRS transmission flow implemented at the base station side in the flow as shown in FIG. 5.

Embodiments of the present application further provides a communication device by which the functions of the base station side in the flow shown in FIG. 9 in the above-mentioned embodiments may be achieved.

Figure 15:
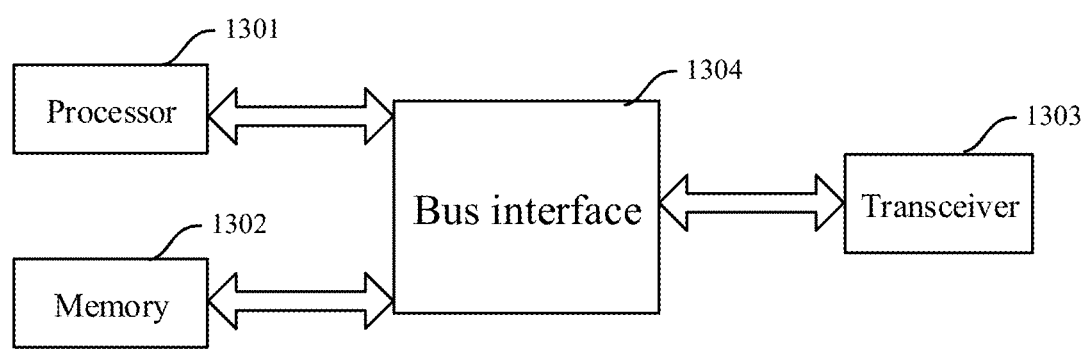
FIG. 15 is a schematic structural diagram showing a communication device according to another embodiment of the present application.

Referring to FIG. 15 which is a schematic structural diagram showing a communication device according to an embodiment of the present application, as shown in the figure, the communication device may include a processor 1301, a memory 1302, a transceiver 1303 and a bus interface 1304.

The processor 1301 is responsible for managing a bus architecture and general processing. The memory 1302 may store data used when the processor 1301 executes operation. The transceiver 1303 is configured to receive and send data under the control of the processor 1301.

The bus architecture may include any number of interconnected buses and bridges, and specifically links various circuits of one or more processors represented by the processor 1301 and a memory represented by the memory 1302 together. The bus architecture may further link various other circuits such as a peripheral device, a voltage stabilizer and a power management circuit, which are publically known in the field, so that further description is not performed herein. The bus interface is provided with an interface. The processor 1301 is responsible for managing the bus architecture and general processing. The memory 1302 may store the data used when the processor 1301 executes operation.

The flow disclosed by the embodiments of the present application may be applied to the processor 1301 or implemented by the processor 1301. During implementation, each step of a signal processing flow may be completed by an integrated logic circuit in a hardware form in the processor 1301 or an instruction in a software form. The processor 1301 may be a general-purpose processor, a digital signal processor, an application-specific integrated circuit, a field-programmable gate array or other programmable logic devices, a discrete gate or transistor logic device and a discrete hardware component and is capable of implementing or executing each method, step and logic block diagram disclosed by the embodiments of the present application. The general-purpose processor may be a microprocessor or any conventional processor and the like. The flow may be directly embodied to be completed by a hardware processor or completed by combination of hardware and software devices in the processor in combination with the steps of the method disclosed in the embodiments of the present application. The software device may be located in a mature storage medium such as a random access memory, a flash memory, a read-only memory, a programmable read-only memory or an electrically erasable and programmable memory and a register in the field. The storage medium is located in the memory 1302, and the processor 1301 reads information in the memory 1302 and is combined with hardware therein to complete the steps of the signal processing flow.

Specifically, the processor 1301 is configured to read a program in the memory 1302 and execute a PRS transmission flow implemented at the base station side in the flow as shown in FIG. 9.

Embodiments of the present application further provide a computer readable storage medium. The computer readable storage medium stores a computer executable instruction, and the computer executable instruction is configured to make a computer execute the flow executed by the base station in FIG. 5.

Embodiments of the present application further provide a computer readable storage medium. The computer readable storage medium stores a computer executable instruction, and the computer executable instruction is configured to make a computer execute the flow executed by the base station in FIG. 9.

The present application is described by referring to a flow diagram and/or a block diagram of the method, device (system) and a computer program product according to the embodiments of the present application. It should be understood that each flow and/or block in the flow diagram and/or the block diagram and a combination of flows and/or blocks in the flow diagram and/or the block diagram may be implemented by computer program instructions. These computer program instructions may be provided for a processor of a general-purpose computer, a special-purpose computer, an embedded processing machine or other programmable data processing devices to generate a machine, so that a device used for achieving a specified function in one or more flows in the flow diagram and/or one or more blocks in the block diagram is generated by an instruction executed by the processor of the computer or other programmable data processing devices.

These computer program instructions may also be stored in a computer readable memory capable of guiding the computer or other programmable data processing devices to work in a specific way, so that a manufactured product including an instruction device is generated by the instruction stored in the computer readable memory, and the instruction device achieves the specified function in one or more flows in the flow diagram and/or one or more blocks in the block diagram.

These computer program instructions may also be loaded on the computer or other programmable data processing devices, and then, a series of operation steps are performed on the computer or other programmable data processing devices to generate processing implemented by the computer, so that the instructions executed on the computer or other programmable data processing devices provide the steps for achieving the specified function in one or more flows in the flow diagram and/or one or more blocks in the block diagram.

What is claimed is:

1. A method for transmitting a positioning reference signal (PRS), comprising:
   determining, by a base station, a time-frequency resource for sending the PRS according to configuration information of the PRS, wherein the configuration information of the PRS comprises PRS frequency domain resource information and time domain configuration information, and the PRS frequency domain resource information comprises PRS resource element (RE) frequency shift information; wherein the PRS RE frequency shift information is correlated with a PRS orthogonal frequency division multiplexing (OFDM) symbol index value calculated from a PRS occasion; wherein the time domain configuration information is used for indicating a starting position of the PRS in a slot, the PRS occupies N continuous symbols in a slot, and N is one of 1, 2, 3, 4, 6 or 12;
   mapping, by the base station, a PRS sequence to the time-frequency resource for sending the PRS; and
   sending, by the base station, the mapped PRS on the time-frequency resource for sending the PRS,
   wherein the method further comprises:
   sending, by the base station, configuration information of a subcarrier spacing of the PRS,
   wherein the subcarrier spacing of the PRS is same with or different from subcarrier spacings of other signals for data communication;
   wherein the subcarrier spacing of the PRS comprises: a subcarrier spacing corresponding to a first frequency range FR1 or a subcarrier spacing corresponding to a second frequency range FR2;
   the subcarrier spacing corresponding to the FR1 is one of 15 kHZ, 30 kHz or 60 kHz, and
   the subcarrier spacing corresponding to the FR2 is one of 60 kHZ or 120 kHz;
   wherein the method further comprises: sending, by the base station, configuration information of a transmission bandwidth of the PRS.

2. The method according to claim 1,
   wherein the transmission bandwidth of the PRS comprises: a transmission bandwidth corresponding to a subcarrier spacing of the PRS within a first frequency range FR1 or a transmission bandwidth corresponding to a subcarrier spacing of the PRS within a second frequency range FR2;
   the transmission bandwidth corresponding to the subcarrier spacing of the PRS within the FR1 is one of multiple transmission bandwidths corresponding to the subcarrier spacing of the PRS within the FR1; and
   the transmission bandwidth corresponding to the subcarrier spacing of the PRS within the FR2 is one of multiple transmission bandwidths corresponding to the subcarrier spacing of the PRS within the FR2.

3. The method according to claim 1, further comprising:
sending, by the base station, configuration information of a duration, a period and a time offset of the PRS,
wherein, if a subcarrier spacing of the PRS is 15 kHz, the configuration information of the duration, the period and the time offset of the PRS covers at least configuration of a duration, a period and a time offset of a PRS in a long term evolution (LTE) system;
or else, the configuration information of the duration, the period and the time offset of the PRS is adjusted in unit of slots;
wherein the period of the PRS is a numerical value in a first number-of-slot set, and the time offset of the PRS is a numerical value in a second number-of-slot set;
the first number-of-slot set is: {4, 5, 8, 10, 16, 20, 32, 40, 64, 80, 160, 320, 640, 1280}; and
the second number-of-slot set is: {0, . . . , P−1}, wherein P is the period of the PRS.

4. The method according to claim 1, wherein one or more PRS resources form a PRS resource set;
a beam of each PRS resource in the resource set has a correspondence with a beam of a synchronization signal (SS)/physical broadcast channel (PBCH); and
the correspondence comprises one or more of a beam direction or a beam width.

5. The method according to claim 1, wherein before the base station sends the mapped PRS on the time-frequency resource for sending the PRS, the method further comprises:
determining, by the base station, a muted and/or an unmuted PRS occasion group on the time-frequency resource for sending the PRS according to PRS muting configuration information and the time-frequency resource for sending the PRS, wherein the PRS muting configuration information comprises PRS occasion group muting configuration information, and the PRS occasion group muting configuration information is used for indicating a PRS occasion group configured to be muted and/or unmuted in one or more PRS occasion groups; and
the sending, by the base station, the mapped PRS on the time-frequency resource for sending the PRS, comprises: sending, by the base station, the mapped PRS in a PRS occasion group determined to be unmuted.

6. The method according to claim 1, wherein before the base station sends the mapped PRS on the time-frequency resource for sending the PRS, the method further comprises:
determining, by the base station, a muted and/or an unmuted PRS block or PRS resource set on the time-frequency resource for sending the PRS according to PRS muting configuration information and the time-frequency resource for sending the PRS, wherein the PRS muting configuration information comprises a PRS block set or PRS occasion muting sequence corresponding to a candidate muted PRS occasion group, and the PRS block set or PRS occasion muting sequence is used for indicating a muted and/or an unmuted PRS occasion in a corresponding candidate muted PRS occasion group; and
the sending, by the base station, the mapped PRS on the time-frequency resource for sending the PRS, comprises: sending, by the base station, the mapped PRS on a PRS occasion determined to be unmuted;
wherein the PRS muting configuration information further comprises a PRS occasion group muting sequence, and the PRS occasion group muting sequence is used for indicating a muted PRS occasion group and a candidate muted PRS occasion group.

7. The method according to claim 1, wherein before the base station sends the mapped PRS on the time-frequency resource for sending the PRS, the method further comprises:
determining, by the base station, a muted and/or an unmuted PRS block or PRS resource set on the time-frequency resource for sending the PRS according to PRS muting configuration information and the time-frequency resource for sending the PRS, wherein the PRS muting configuration information comprises a PRS block or PRS resource set muting sequence corresponding to a candidate muted PRS occasion, and the PRS block or PRS resource set muting sequence is used for indicating a muted and/or an unmuted PRS block or PRS resource set in a corresponding candidate muted PRS occasion; and
the sending, by the base station, the mapped PRS on the time-frequency resource for sending the PRS, comprises: sending, by the base station, the mapped PRS on a PRS block or PRS resource set determined to be unmuted;
wherein the PRS muting configuration information further comprises a PRS block set or PRS occasion muting sequence corresponding to a candidate muted PRS occasion group, and the PRS block set or PRS occasion muting sequence is used for indicating a muted PRS occasion and a candidate muted PRS occasion in a corresponding candidate muted PRS occasion group;
wherein the PRS muting configuration information further comprises a PRS occasion group muting sequence, and the PRS occasion group muting sequence is used for indicating a muted PRS occasion group and a candidate muted PRS occasion group.

8. The method according to claim 1, wherein before the base station sends the mapped PRS on the time-frequency resource for sending the PRS, the method further comprises:
determining, by the base station, a muted and/or an unmuted PRS block or PRS resource set on the time-frequency resource for sending the PRS according to PRS muting configuration information and the time-frequency resource for sending the PRS, wherein the PRS muting configuration information comprises a PRS resource muting sequence corresponding to a candidate muted PRS block or PRS resource set, and the PRS resource muting sequence is used for indicating a muted and/or an unmuted PRS resource in a corresponding candidate muted PRS block or PRS resource set; and
the sending, by the base station, the mapped PRS on the time-frequency resource for sending the PRS, comprises: sending, by the base station, the mapped PRS on a PRS resource determined to be unmuted;
wherein the PRS muting configuration information further comprises a PRS block or PRS resource set muting sequence corresponding to a candidate muted PRS occasion, and the PRS block or PRS resource set muting sequence is used for indicating a muted PRS block or PRS resource set and a candidate muted PRS block or PRS resource set in a corresponding candidate muted PRS occasion;
wherein the PRS muting configuration information further comprises a PRS block set or PRS occasion muting sequence corresponding to a candidate muted PRS occasion group, and the PRS block set or PRS occasion muting sequence is used for indicating a muted PRS occasion and a candidate muted PRS occasion in a corresponding candidate muted PRS occasion group;

wherein the PRS muting configuration information further comprises a PRS occasion group muting sequence, and the PRS occasion group muting sequence is used for indicating a muted PRS occasion group and a candidate muted PRS occasion group.

9. The method according to claim 1, wherein before the base station sends the mapped PRS on the time-frequency resource for sending the PRS, the method further comprises:

determining, by the base station, a muted and/or an unmuted PRS block or PRS resource set on the time-frequency resource for sending the PRS according to PRS muting configuration information and the time-frequency resource for sending the PRS, wherein the PRS muting configuration information is used for indicating a muted PRS occasion group, a candidate muted PRS occasion group, and a muted PRS block or PRS resource set in the candidate muted PRS occasion group; and the sending, by the base station, the mapped PRS on the time-frequency resource for sending the PRS, comprises: sending, by the base station, the mapped PRS on a PRS block or PRS resource set determined to be unmuted;

wherein the PRS muting configuration information comprises: PRS occasion group muting configuration information;

the PRS occasion group muting configuration information is used for indicating a muted PRS occasion group and a candidate muted PRS occasion group, wherein all PRS blocks or PRS resource sets corresponding to the muted PRS occasion group are muted; and for each candidate muted PRS occasion group indicated by the PRS occasion group muting configuration information, corresponding PRS block or PRS resource set muting configuration information is configured to indicate whether a PRS block or PRS resource set in a corresponding candidate muted PRS occasion group is muted.

10. The method according to claim 6, wherein PRSs in one PRS block or PRS resource set are transmitted by using the same beam.

11. A method for transmitting a positioning reference signal (PRS), comprising:

determining, by a base station, a muted and/or an unmuted PRS resource on a time-frequency resource for sending the PRS according to PRS muting configuration information and the time-frequency resource for sending the PRS; wherein the time-frequency resource for sending the PRS is determined according to configuration information of the PRS; the configuration information of the PRS comprises PRS frequency domain resource information and time domain configuration information; and the PRS frequency domain resource information comprises PRS resource element (RE) frequency shift information; wherein the PRS RE frequency shift information is correlated with a PRS orthogonal frequency division multiplexing (OFDM) symbol index value calculated from a PRS occasion; wherein the time domain configuration information is used for indicating a starting position of the PRS in a slot, the PRS occupies N continuous symbols in a slot, and N is one of 1, 2, 3, 4, 6 or 12; and sending, by the base station, a mapped PRS on a PRS resource determined to be unmuted;

wherein the method further comprises:

sending, by the base station, configuration information of a subcarrier spacing of the PRS, wherein the subcarrier spacing of the PRS is same with or different from subcarrier spacings of other signals for data communication;

wherein the subcarrier spacing of the PRS comprises: a subcarrier spacing corresponding to a first frequency range FR1 or a subcarrier spacing corresponding to a second frequency range FR2;

the subcarrier spacing corresponding to the FR1 is one of 15 kHZ, 30 kHz or 60 kHz, and the subcarrier spacing corresponding to the FR2 is one of 60 kHZ or 120 kHz;

wherein the method further comprises: sending, by the base station, configuration information of a transmission bandwidth of the PRS.

12. The method according to claim 11, wherein the PRS muting configuration information is used for indicating a muted PRS occasion group, a candidate muted PRS occasion group, and a muted PRS block or PRS resource set in the candidate muted PRS occasion group; and the sending, by the base station, the mapped PRS on the PRS resource determined to be unmuted, comprises: sending, by the base station, the mapped PRS on a PRS block or PRS resource set determined to be unmuted;

wherein the PRS muting configuration information comprises: PRS occasion group muting configuration information;

the PRS occasion group muting configuration information is used for indicating a muted PRS occasion group and a candidate muted PRS occasion group, wherein all PRS blocks or PRS resource sets corresponding to the muted PRS occasion group are muted; and for each candidate muted PRS occasion group indicated by the PRS occasion group muting configuration information, corresponding PRS block or PRS resource set muting configuration information is configured to indicate whether a PRS block or PRS resource set in a corresponding candidate muted PRS occasion group is muted.

13. The method according to claim 11, wherein the determining, by the base station, the muted and/or the unmuted PRS resource on the time-frequency resource for sending the PRS according to the PRS muting configuration information and the time-frequency resource for sending the PRS, comprises:

determining, by the base station, a muted and/or an unmuted PRS occasion group the time-frequency resource for sending the PRS according to the PRS muting configuration information and the time-frequency resource for sending the PRS, wherein the PRS muting configuration information comprises PRS occasion group muting configuration information, and the PRS occasion group muting configuration information is used for indicating a PRS occasion group configured to be muted and/or unmuted in one or more PRS occasion groups; and the sending, by the base station, the mapped PRS on the PRS resource determined to be unmuted, comprises: sending, by the base station, the mapped PRS in a PRS occasion group determined to be unmuted.

14. The method according to claim 11, wherein the determining, by the base station, the muted and/or the unmuted PRS resource on the time-frequency resource for sending the PRS according to the PRS muting configuration information and the time-frequency resource for sending the PRS, comprises:

determining, by the base station, a muted and/or an unmuted PRS block or PRS resource set on the time-frequency resource for sending the PRS according to the PRS muting configuration information and the time-frequency resource for sending the PRS, wherein the PRS muting configuration information comprises a PRS occasion muting sequence corresponding to a candidate muted PRS occasion group, and the PRS occasion muting sequence is used for indicating a muted and/or an unmuted PRS occasion in a corresponding candidate muted PRS occasion group; and the sending, by the base station, the mapped PRS on the PRS resource determined to be unmuted, comprises: sending, by the base station, the mapped PRS on a PRS occasion determined to be unmuted;

wherein the PRS muting configuration information further comprises a PRS occasion group muting sequence, and the PRS occasion group muting sequence is used for indicating a muted PRS occasion group and a candidate muted PRS occasion group.

15. The method according to claim 11, wherein the determining, by the base station, the muted and/or the unmuted PRS resource on the time-frequency resource for sending the PRS according to the PRS muting configuration information and the time-frequency resource for sending the PRS, comprises:

determining, by the base station, a muted and/or an unmuted PRS block or PRS resource set on the time-frequency resource for sending the PRS according to the PRS muting configuration information and the time-frequency resource for sending the PRS, wherein the PRS muting configuration information comprises a PRS block or PRS resource set muting sequence corresponding to a candidate muted PRS occasion, and the PRS block or PRS resource set muting sequence is used for indicating a muted and/or unmuted PRS block or PRS resource set in a corresponding candidate muted PRS occasion; and the sending, by the base station, the mapped PRS on the PRS resource determined to be unmuted, comprises: sending, by the base station, the mapped PRS on a PRS block or PRS resource set determined to be unmuted;

wherein the PRS muting configuration information further comprises a PRS block set or PRS occasion muting sequence corresponding to a candidate muted PRS occasion group, and the PRS block set or PRS occasion muting sequence is used for indicating a muted PRS occasion and a candidate muted PRS occasion in a corresponding candidate muted PRS occasion group;

wherein the PRS muting configuration information further comprises a PRS occasion group muting sequence; and the PRS occasion group muting sequence is used for indicating a muted PRS occasion group and a candidate muted PRS occasion group.

16. The method according to claim 11, wherein the determining, by the base station, the muted and/or the unmuted PRS resource on a time-frequency resource for sending the PRS according to the PRS muting configuration information and the time-frequency resource for sending the PRS, comprises:

determining, by the base station, a muted and/or an unmuted PRS block or PRS resource set on the time-frequency resource for sending the PRS according to the PRS muting configuration information and the time-frequency resource for sending the PRS, wherein the PRS muting configuration information comprises a PRS resource muting sequence corresponding to a candidate muted PRS block or PRS resource set, and the PRS resource muting sequence is used for indicating a muted and/or an unmuted PRS resource in a corresponding candidate muted PRS block or PRS resource set; and the sending, by the base station, the mapped PRS on the PRS resource determined to be unmuted, comprises: sending, by the base station, the mapped PRS on the PRS resource determined to be unmuted;

wherein the PRS muting configuration information further comprises a PRS block or PRS resource set muting sequence corresponding to a candidate muted PRS occasion, and the PRS block or PRS resource set muting sequence is used for indicating a muted PRS block or PRS resource set and a candidate muted PRS block or PRS resource set in a corresponding candidate muted PRS occasion;

wherein the PRS muting configuration information further comprises a PRS occasion muting sequence corresponding to a candidate muted PRS occasion group, and the PRS occasion muting sequence is used for indicating a muted PRS occasion and a candidate muted PRS occasion in a corresponding candidate muted PRS occasion group;

wherein the PRS muting configuration information further comprises a PRS occasion group muting sequence, and the PRS occasion group muting sequence is used for indicating a muted PRS occasion group and a candidate muted PRS occasion group.

17. A communication device, comprising a processor, a memory and a transceiver; wherein the transceiver is configured to receive or transmit information under control of the processor; and the processor is configured to read a program in the memory and execute the method according to claim 1.

18. A communication device, comprising a processor, a memory and a transceiver; wherein the transceiver is configured to receive or transmit information under control of the processor; and the processor is configured to read a program in the memory and execute the method according to claim 11.

* * * * *